US011864680B2

(12) United States Patent
Davis et al.

(10) Patent No.: US 11,864,680 B2
(45) Date of Patent: Jan. 9, 2024

(54) PILLOW APPARATUS

(71) Applicant: BANYAN LICENSING L.L.C., Vero Beach, FL (US)

(72) Inventors: E. Scott Davis, Vero Beach, FL (US); Scott Allen Sattizahn, Charlotte, NC (US); Timothy James Rohm, Gastonia, NC (US)

(73) Assignee: Banyan Licensing L.L.C., Vero Beach, FL (US)

( * ) Notice: Subject to any disclaimer, the term of this patent is extended or adjusted under 35 U.S.C. 154(b) by 27 days.

(21) Appl. No.: 17/150,914

(22) Filed: Jan. 15, 2021

(65) Prior Publication Data

US 2021/0127866 A1 May 6, 2021

Related U.S. Application Data

(63) Continuation of application No. 16/252,221, filed on Jan. 18, 2019, now Pat. No. 10,893,762.

(Continued)

(51) Int. Cl.
*A47G 9/10* (2006.01)
*A61G 7/075* (2006.01)

(52) U.S. Cl.
CPC ............... *A47G 9/10* (2013.01); *A61G 7/075* (2013.01); *A61G 7/0755* (2013.01); *A47G 2009/1018* (2013.01)

(58) Field of Classification Search
CPC .. A47G 9/10; A47G 2009/1018; A61G 7/075; A61G 7/0755
See application file for complete search history.

(56) References Cited

U.S. PATENT DOCUMENTS 1,312,886 A 8/1919 William
1,890,358 A 12/1932 Barcalo
(Continued)

FOREIGN PATENT DOCUMENTS

CA 2272161 A1 * 11/2000 ........... A47C 20/021
CA 2272161 A1 11/2000
(Continued)

OTHER PUBLICATIONS

International Search Report for PCT Application No. PCT/US2019/014800 dated Jun. 5, 2019.
(Continued)

*Primary Examiner* — Fredrick C Conley
(74) *Attorney, Agent, or Firm* — Moore & Van Allen, PLLC; Henry B. Ward, III

(57) ABSTRACT

Embodiments of the present invention are directed to a pillow apparatus that is structured to support a user's limbs or legs. The pillow apparatus typically comprises a pillow body. The pillow body typically comprises a first concave depression positioned on a first surface of the pillow body. The first concave depression is structured to support at least a portion of a thigh of a user or a portion of crus leg part of the user. In some embodiments, the pillow body also comprises a second concave depression positioned on a second surface of the pillow body, opposite the first surface. Moreover, in some embodiments, the pillow apparatus comprises a coupling member structured for releasably connecting the pillow apparatus with an adjacent pillow apparatus.

18 Claims, 9 Drawing Sheets

Related U.S. Application Data

(60) Provisional application No. 62/622,207, filed on Jan. 26, 2018.

(56) References Cited

U.S. PATENT DOCUMENTS 2,056,767 A 10/1936 Blath
2,522,120 A * 9/1950 Kaskey .................... A47G 9/10 5/636
2,759,200 A 8/1956 Ohnston
2,816,556 A 12/1957 Weber et al.
2,835,905 A * 5/1958 Tomasson ................ A47G 9/10 5/636
2,877,472 A 3/1959 Wagner
3,308,489 A 3/1967 Winkler
D211,244 S * 6/1968 Hawley .......................... D6/601
3,604,023 A 9/1971 Lynch
3,795,018 A 3/1974 Broaded
3,946,451 A * 3/1976 Spann .................. A61G 7/0755 5/652
4,007,503 A * 2/1977 Watkin ..................... A47G 9/10 5/490
4,173,048 A 11/1979 Varaney
4,177,806 A 12/1979 Griffin
D258,557 S 3/1981 Herr
D268,803 S 5/1983 Roberts
4,447,922 A * 5/1984 Brochu ................ A61G 13/121 5/640
4,480,346 A 11/1984 Hawkins et al.
4,584,730 A 4/1986 Rajan
4,624,021 A 11/1986 Hofstetter
D293,186 S 12/1987 Parnham
D295,248 S 4/1988 Sommerfield et al.
4,736,477 A 4/1988 Moore
4,754,510 A 7/1988 King
4,910,818 A 3/1990 Grabill et al.
D316,354 S * 4/1991 Bool .............................. D6/601
5,117,522 A 6/1992 Everett
5,125,123 A 6/1992 Engle
5,216,771 A * 6/1993 Hoff ..................... A47C 20/025 5/652
5,269,323 A 12/1993 Krouskop
D346,926 S 5/1994 Sullivan
5,340,067 A 8/1994 Martin et al.
D354,876 S * 1/1995 Pace .............................. D6/601
5,416,908 A 5/1995 Dicarlo et al.
5,418,991 A 5/1995 Shiflett
D381,232 S 7/1997 Jansson
5,664,271 A * 9/1997 Bellavance .......... A47C 20/021 5/652
5,746,218 A 5/1998 Edge
D400,304 S * 10/1998 Stankovic ...................... D28/57
D414,368 S 9/1999 Wingard
6,032,669 A * 3/2000 Klein ................... A47C 20/021 128/845
6,145,508 A 11/2000 Seip
6,154,905 A 12/2000 Frydman
6,175,979 B1 1/2001 Jackson
6,179,756 B1 1/2001 Bertolucci et al.
D438,624 S * 3/2001 Reina ........................... D24/190
6,438,779 B1 * 8/2002 Brown ................. A47C 20/021 5/915
D464,520 S 10/2002 Bond
6,564,407 B1 5/2003 Luu et al.
6,578,218 B2 6/2003 Wassilefsky
6,640,368 B2 11/2003 Roston
6,760,936 B1 7/2004 Lloyd
6,789,282 B1 9/2004 Frydman
6,807,697 B2 10/2004 Druery et al.
D502,834 S * 3/2005 Wells ............................. D6/601
D503,580 S 4/2005 Donoghue
6,886,201 B1 5/2005 Weiss-Lohrei
7,150,057 B1 12/2006 Santiago et al.
D539,066 S * 3/2007 Coquillette .................... D6/601
D546,107 S * 7/2007 Babcock ........................ D6/601
D612,654 S * 3/2010 Eura .............................. D6/601
7,735,169 B2 6/2010 Wassilefsky
D637,439 S * 5/2011 Mettler .......................... D6/601
8,418,297 B2 4/2013 Mikkelsen et al.
8,656,537 B2 2/2014 Leifermann et al.
D702,329 S * 4/2014 Cerda .......................... D23/269
8,931,120 B1 1/2015 Cerda
D726,451 S * 4/2015 Lee ............................... D6/601
D727,661 S 4/2015 Blumenthal
D732,313 S * 6/2015 Fux ................................ D6/601
D733,462 S * 7/2015 Pellegrini ...................... D6/601
D734,545 S * 7/2015 Cantu ........................... D6/601
D734,546 S * 7/2015 Baker ........................... D6/601
D754,990 S 5/2016 Velasquez
D755,542 S 5/2016 Stephanoff et al.
9,603,458 B2 3/2017 Pelletier
9,648,959 B2 5/2017 Frydman
9,775,440 B1 10/2017 Chon et al.
9,775,451 B1 10/2017 Chon et al.
9,795,232 B2 10/2017 Holbrook et al.
D817,032 S 5/2018 Yang
D823,027 S 7/2018 Zou
D826,596 S * 8/2018 Yang .............................. D6/601
D828,702 S 9/2018 Chen
D836,363 S 12/2018 Cornelius et al.
D837,386 S 1/2019 Barber et al.
D837,569 S 1/2019 Barcohana
D838,513 S 1/2019 Davis et al.
D846,312 S * 4/2019 Davis ............................ D6/601
D880,902 S * 4/2020 Davis ............................ D6/601
D898,443 S * 10/2020 Romano ........................ D6/601
D898,444 S * 10/2020 Chen ............................. D6/601
D930,401 S * 9/2021 Ye ................................. D6/601
D943,752 S * 2/2022 Watters, III .................. D24/190
11,357,347 B1 * 6/2022 Mani ........................ A47G 9/10
2002/0095731 A1 * 7/2002 Hall ....................... A61G 7/075 5/648
2005/0000021 A1 1/2005 Bordan
2005/0172408 A1 * 8/2005 Temple .................... A47G 9/10 5/652
2005/0273934 A1 12/2005 Hunter
2007/0027577 A1 * 2/2007 Lunak ................. G07F 17/0092 700/236
2008/0092297 A1 * 4/2008 Davis .................. A47C 20/021 5/648
2008/0301878 A1 12/2008 Elhabashy
2009/0211031 A1 8/2009 Kloes et al.
2009/0229056 A1 * 9/2009 Edinger ............... A47C 20/021 5/648
2010/0078033 A1 4/2010 Aikman
2010/0319707 A1 * 12/2010 Cardin ................. A61H 1/0237 128/845
2012/0005834 A1 * 1/2012 Kent ...................... A47D 13/08 5/655
2012/0112506 A1 5/2012 Glyck
2013/0074269 A1 3/2013 Phillips, II
2013/0232693 A1 * 9/2013 Myers ...................... A47G 9/10 5/636
2013/0283534 A1 10/2013 Marinkovic
2014/0041125 A1 2/2014 Grealy
2014/0215719 A1 8/2014 Gibbons et al.
2016/0100694 A1 * 4/2016 Pelletier ............... A61G 7/0755 5/648
2017/0119624 A1 5/2017 Kim
2020/0022500 A1 * 1/2020 Green ....................... F16B 1/00

FOREIGN PATENT DOCUMENTS

CA 2882016 C 4/2016
CN 205947965 U 2/2017
FR 2841758 A1 * 1/2004
GB 2417897 A * 3/2006 ............ A47G 9/109
NL 1017231 C2 7/2002
WO 0076371 A3 2/2001
WO 2004062442 A1 7/2004
WO 2006099712 A1 9/2006
WO WO-2006099712 A1 * 9/2006
WO 2012162751 A1 12/2012

(56) References Cited

FOREIGN PATENT DOCUMENTS

| | | | | | |
|---|---|---|---|---|---|
| WO | 2013075148 | A1 | | 5/2013 | |
| WO | 2014025181 | A1 | | 2/2014 | |
| WO | WO-2014121258 | A1 | * | 8/2014 | ............... A47C 7/36 |
| WO | 2016046415 | A1 | | 3/2016 | |

OTHER PUBLICATIONS

Written Opinion for PCT Application No. PCT/US2019/014800 dated Jun. 5, 2019.

Office Action issued by Japan Patent Office for Japanese Design Application No. 2018-027266 dated Jun. 18, 2019.

Notice of Allowance issued by the U.S. Patent and Trademark Office for U.S. Appl. No. 29/688,442, dated Dec. 9, 2022.

Supplemental Notice of Allowance issued by the U.S. Patent and Trademark Office for U.S. Appl. No. 29/688,442, dated Jan. 4, 2023.

* cited by examiner 500B
510a
Ha
512
515
510c
514
511a
510
510b
500
513
511
510c
516
Tb 500D
510b
510
516
511a
513

500
512a
510c
512
514
511
510a
Ta
513
511
514
512
500E
510c
T
511

Wb'
Y
516
500
511a
511
510
W
515
W'
513
510a
514
510c
Y
514a
510b
500A

Wa'
Hb
516
X
500
513
L
T
512

511
510
X
Ha
514
500C

PILLOW APPARATUS

CROSS-REFERENCE TO PRIORITY APPLICATION

This application is a continuation of U.S. patent application Ser. No. 16/252,221 entitled "Pillow Apparatus", filed Jan. 18, 2019 which published as U.S. App. Pub. No. 2019/0231099A1, which claims the benefit of U.S. Provisional Patent Application Ser. No. 62/622,207 entitled "Pillow Apparatus," filed on Jan. 26, 2018, all of which are hereby incorporated by reference in its entirety.

FIELD OF THE INVENTION

The present invention relates to support devices and, more specifically, a pillow apparatus that is structured to support a user's limbs or legs.

BACKGROUND

A pillow is generally useful for the purpose of rendering comfort or support to a user. Conventional pillows are manufactured using "pillow-filler material" such as high resilient ("HR") urethane foam and are typically structured to support the head of a user. However, these pillows are unable to provide optimal support to a user's limbs, and more specifically, the user's legs. Conventional pillows may cause undue pressure, strain and discomfort along the user's lower body or limbs or legs, e.g., crotch, thighs, knees, or lower legs, if employed to support the legs. Thus, there is a need for a pillow apparatus that is structured to support a user's limbs and, more specifically, a user's lower limbs or legs.

BRIEF SUMMARY

Embodiments of the invention are directed to, in general, a pillow apparatus that is structured to support a user's limbs or legs. In general, the pillow apparatus comprises a pillow body. The pillow body comprises a first concave depression positioned on a first surface of the pillow body. The first concave depression is structured to support at least a portion of a thigh of a user or a portion of crus leg part of the user. In some embodiments, the pillow body also comprises a second concave depression positioned on a second surface of the pillow body, opposite the first surface. Moreover, in some embodiments, the pillow apparatus comprises a coupling member structured for detachably coupling the pillow apparatus with an adjacent pillow apparatus.

Embodiments of the pillow apparatus are described below. In accordance with some embodiments, the pillow apparatus comprises a pillow body having a first end, a second end, a first lateral side, a second lateral side, a first surface extending between the first end and second end and the first lateral side and the second lateral side, a second surface extending between the first end and second end and the first lateral side and the second lateral side, and a first concave depression positioned on the first surface of the pillow body and extending from the first end to the second end.

In some embodiments or in combination with the previous embodiment, the first concave depression defines a first width at the first end and a second width at the second end and wherein the first width is greater than the second width.

In some embodiments or in combination with any of the previous embodiments, the width of the first concave depression tapers continuously from the first end to the second end or tapers discontinuously from the first end to the second end.

In some embodiments or in combination with any of the previous embodiments, the pillow body comprises a second concave depression positioned on the second surface of the pillow body and extending from the first end to the second end, the second concave depression defining a first width at the first end and a second width at the second end and wherein the first width is greater than the second width.

In some embodiments or in combination with any of the previous embodiments, the width of the second concave depression tapers gradually from the first end to the second end or tapers discontinuously from the first end to the second end.

In some embodiments or in combination with any of the previous embodiments, the pillow body defines a first minimum thickness at the first end between the first surface and the second surface of the pillow body and a second minimum thickness at the second end between the first surface and the second surface of the pillow body, and wherein the first minimum thickness is less than the second minimum thickness.

In some embodiments or in combination with any of the previous embodiments, the first end of the pillow body defines a concaved surface, which provides spacing to accommodate a user's groin area.

In some embodiments or in combination with any of the previous embodiments, the first and second lateral sides define a first height at the first end of the pillow body and a second height at the second end of the pillow body and wherein the first height is greater than the second height.

In some embodiments or in combination with any of the previous embodiments, the first and second lateral sides define a first height at the first end of the pillow body and a second height at the second end of the pillow body and wherein the first height is greater than the second height.

In some embodiments or in combination with any of the previous embodiments, the height of the first lateral side and the second lateral side tapers gradually from the first end to the second end or tapers discontinuously from the first end to the second end.

In some embodiments or in combination with any of the previous embodiments, the first concave depression and the second concave depression are symmetric.

In accordance with yet other embodiments of the invention, a pillow apparatus comprises a first pillow body having a first end, a second end, a first lateral side, a second lateral side, a first surface extending between the first end and second end and the first lateral side and the second lateral side, and a second surface extending between the first end and second end and the first lateral side and the second lateral side. The pillow apparatus further comprises a second pillow body having a first end, a second end, a first lateral side, a second lateral side, a first surface extending between the first end and second end and the first lateral side and the second lateral side, a second surface extending between the first end and second end and the first lateral side and the second lateral side. Moreover, the pillow apparatus comprises (i) a first cover enclosing the first pillow body, the first cover comprising a first coupling member extending therefrom; and (ii) a second cover enclosing the second pillow body, the second cover comprising a second coupling member extending therefrom, and wherein the first coupling member and the second coupling member are releasably connected.

In some embodiments or in combination with any of the previous embodiments, each of the first pillow body and second pillow body define a first concave depression positioned on the first surface of the pillow body extending from the first end to the second end, the first concave depression defining a first width at the first end and a second width at the second end and wherein the first width is greater than the second width.

In some embodiments or in combination with any of the previous embodiments, the width of the first concave depression of at least one selected from the group of the first pillow body and second pillow body tapers continuously from the first end to the second end or tapers discontinuously from the first end to the second end.

In some embodiments or in combination with any of the previous embodiments, each of the first pillow body and second pillow body comprises a second concave depression positioned on the second surface of the pillow body and extending from the first end to the second end, the second concave depression defining a first width at the first end and a second width at the second end and wherein the first width is greater than the second width.

In some embodiments or in combination with any of the previous embodiments, the width of the second concave depression of at least one selected from the group of the first pillow body and second pillow tapers gradually from the first end to the second end or tapers discontinuously from the first end to the second end.

In some embodiments or in combination with any of the previous embodiments, each of the first pillow body and second pillow body defines a first minimum thickness at the first end between the first side and the second side of the pillow body and a second minimum thickness at the second end between the first side and the second side of the pillow body, and wherein the first minimum thickness is less than the second minimum thickness.

In yet other embodiments of the invention, alone or in combination with any of the previous embodiments, the first end of each of the first pillow body and second pillow body defines a concaved surface.

In yet other embodiments of the invention, alone or in combination with any of the previous embodiments, the first and second lateral sides of each of the first pillow body and second pillow body define a first height at the first end of the pillow body and a second height at the second end of the pillow body and wherein the first height is greater than the second height.

In yet other embodiments of the invention, alone or in combination with any of the previous embodiments, the height of the first lateral side and the second lateral side tapers gradually from the first end to the second end or tapers discontinuously from the first end to the second end.

Some embodiments of the invention are directed to a method for assembling/constructing a pillow apparatus assembly, alone or in combination with any of the previous embodiments. The method typically comprises one or more steps of: positioning the first pillow apparatus adjacent to the second pillow apparatus such that the first coupling member and the second coupling member are proximate; detachably coupling the first coupling member and the second coupling member, thereby coupling the first pillow apparatus to the second pillow apparatus, wherein the detachably coupled first coupling member and the second coupling member form a coupling pair; and/or varying a distance between the first pillow apparatus and the second pillow apparatus using the coupling pair.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The structure of the pillow apparatus of the present invention is advantageous as the pillow apparatus is contoured so that the pillow apparatus naturally fits the shape of the user's thighs. In the embodiment of two pillows coupled together, the first pillow apparatus is contoured so that the pillow apparatus naturally fits the shape of the user's thighs while the second pillow apparatus is contoured to naturally fit the top of the user's calf and cradle the user's ankle.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The pillow apparatus of the present invention alleviates the forgoing deficiencies of conventional pillows and also provides additional advantages. The advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein.

DETAILED DESCRIPTION OF THE INVENTION

Figures 1A, 1B, 1C, 1D, 1E:
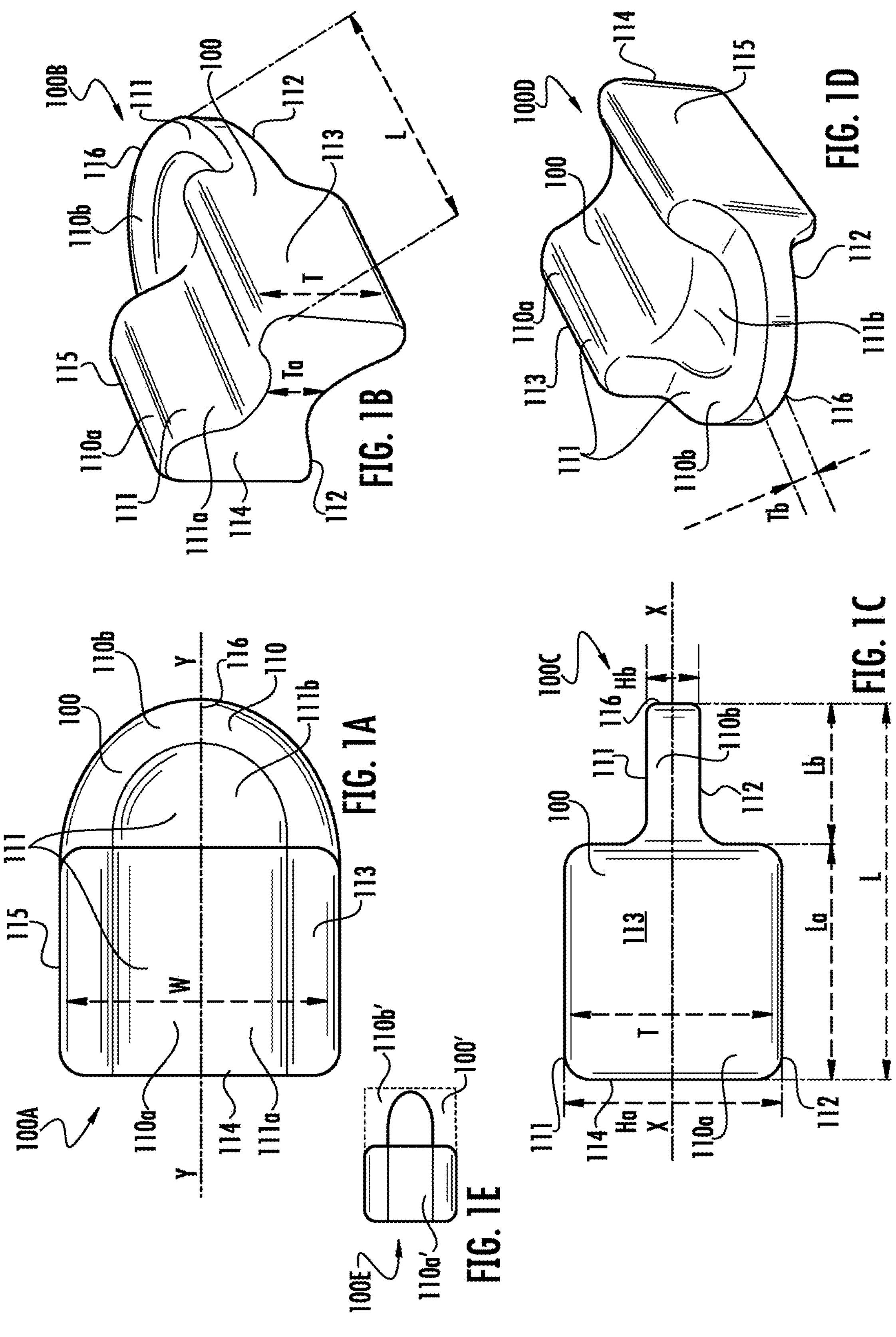
FIGS. 1A-1E illustrate views of a pillow apparatus 100, in accordance with some embodiments of the invention.

The present invention now will be described more fully hereinafter with reference to the accompanying drawings, in which some, but not all embodiments of the invention are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Conventional pillows are unable to provide optimal support to a user's legs, when placed between the user's legs, e.g., when the user is in a side sleeping position. Conventional pillows are typically either too thick and/or comprise vertical side supports which restrict the hinge movement of the knee, or have no means for optimally supporting the knee at all. Positioning the conventional pillows (when placed between the user's thighs) lower along the user's thighs to somehow separate the knees restricts the hinge movement of the knee, and in the converse, positioning the conventional pillow higher along the user's thighs to allow the movement of the knees causes discomfort/pressure at the bottom of the pelvis (e.g., crotch region of the user) and fails to create any spacing between the knees. Also, conventional pillows are typically too thick or otherwise inadequate for optimally supporting the user's thighs, and may cause pressure points and discomfort in the upper thighs of the user, in particular.

The pillow of the embodiments of the present invention, as will be described in detail below, overcomes the foregoing disadvantages of conventional pillows and not only (i) optimally supports and stabilizes the legs (e.g., thigh portions) of the user, but also provides (ii) optimal separation and (iii) cushioning of the knees. Moreover, the design and structure of the pillow apparatus, with its specific contour and predetermined thickness profiles, allows unrestricted bending of knees of the user (e.g., when the user places the pillow apparatus between the user's legs during a side sleeping position) and allows the user to easily and comfortably adopt a fetal position, without causing any strain or pressure points. In addition, the pillow apparatus of the present invention is contoured, shaped and dimensioned to optimally separate, cushion and support the thighs of a user, without causing any strain or pressure points and without causing discomfort or pressure at the bottom of the pelvis (e.g., crotch region of the user). In addition, embodiments of the invention are directed to a flexible, customizable pillow apparatus assembly that is configured to support (i) at least a portion of a thigh of a user and (ii) at least a portion of a crus leg part of the user. This unique assembly is structured to individually tailor/adapt based on the desired comfort for the user. The pillow apparatuses in the assembly can be detachably coupled and moved, rotated, turned, or otherwise distanced, even when coupled together. The functions and features of various embodiments of the pillow apparatus are described below. It should be appreciated that these features can be provided separately in pillow apparatus or the pillow apparatus may have combinations of individual features or may have all of the features.

FIGS. 1A-1E illustrate a pillow apparatus 100, in accordance with one embodiment of the invention. The pillow apparatus 100 includes a pillow body 110, as illustrated by FIGS. 1A-1E. In some embodiments, the pillow apparatus 100 also comprises an outer cover (not illustrated) configured to at least partially enclose the pillow body 110. The outer cover is preferably made of a material that is soft to the skin of the user, e.g., silk, satin or cotton, and is preferably removable so that the outer cover may be washed and then refitted on the pillow apparatus. In some embodiments, the pillow body 110 comprises one or more types of filler material, which may be enclosed by a barrier or sheath (not illustrated) in some instances. The configuration of these components is described below in detail. The pillow apparatus 100 can comprise more or fewer components as required for various embodiments.

FIG. 1A illustrates a lateral view 100A of a pillow apparatus 100. FIG. 1B illustrates a first perspective view 100B (e.g., a front perspective view) of the pillow apparatus 100. In one position/arrangement of the pillow apparatus 100 and/or position of the observer with respect to the pillow apparatus 100, the lateral view 100A of FIG. 1A is a top view of the pillow apparatus 100 (e.g., when viewed from side 111 of FIG. 1B), the side view 100C of FIG. 1C is a right side view of the pillow apparatus 100 (e.g., when viewed from side 113 of FIG. 1B), and the second perspective view 100D of FIG. 1D is a rear perspective view of the pillow apparatus 100 (e.g., when viewed from end 116 of FIG. 1B).

Referring to FIGS. 1A-1D, the pillow body 110 of the pillow apparatus 100 comprises a first body portion 110*a* comprising a first concave depression and an adjacent second body portion 110*b* comprising a second concave depression, extending from the first body portion 110*b*. The first body portion 110*a* is shaped, dimensioned and otherwise structured to support and cushion the thighs of a user, when the user places the pillow apparatus 100 between the user's legs, for example, during a side sleeping position. The second body portion 110*b* extends beyond the thigh support of the first body portion 110*a* and is shaped, dimensioned and otherwise structured to support and cushion the knees of a user, when the user places the pillow apparatus 100 between the user's legs, for example, during a side sleeping position. This configuration not only provides (i) optimal support and stabilizes the legs (e.g., thigh portions) of the user, but also provides (ii) optimal separation of the knees, (iii) cushioning of the knees and (iv) unrestricted and comfortable hinge movement of the knees (e.g., rotation/pivoting of the lower legs with respect to the thighs).

Specifically, the body portion 110 comprises a first surface 111 and an opposite second surface 112. In some embodiments, the first surface 111 is a three-dimensional contoured surface, e.g., a curved or curvilinear surface. As such, the first surface 111 may comprise one or more of a complex curvilinear surface, at least a section of a paraboloid surface, at least a section of an ellipsoid surface, at least a section of a quadratic surface, a three-dimensional curved surface, a linear or planar surface, and/or a suitable combination of the foregoing. The first surface 111 typically comprises a first concave portion 111*a* at the first body portion 110*a* which is shaped, dimensioned and otherwise structured to receive and at least partially surround a thigh of a user (e.g., thigh of a first leg when the pillow apparatus is placed between the two legs of the user). The first surface 111 typically also comprises a second concave portion 111*b* at the second body portion 110*b*, adjacent to and extending from the first concave portion 111*a*, which is shaped, dimensioned and otherwise structured to receive and at least partially surround a knee of a user and allow unrestricted hinge movement of the knee (e.g., knee of a first leg when placed between the two legs of the user). The perimeter of the first surface 111 may be shaped like a rectangle, a polygon, rounded parabolic or any other rectilinear or curvilinear shape. In some embodiments, the perimeter of the first surface 111 comprises a combination of straight and curved surfaces (best illustrated by FIGS. 1A and 1B) with a generally quadrilateral-shaped first body portion 110*a* and generally semi-circular shaped second body portion 110*b*. In some embodiments, the body portion 110 may be hollow.

As such, the first surface 111 may be dimensioned by a width function W and a length function L. In some embodiments, the value of the width function W of the pillow apparatus is defined as the distance between a first pair of opposing ends of the first surface 111 (e.g., perpendicular distance between opposing lateral sides or surfaces 113 and 115 which terminate the first surface, as will be described below, measured on a plane perpendicular to both the lateral sides or surfaces 113 and 115). In some embodiments, the value of the length function L of the pillow apparatus is defined as the distance between a second pair of opposing ends of the first surface 111 (e.g., perpendicular distance between opposing ends 114 and 116 which terminate the first surface, as will be described below, measured on a plane perpendicular to both the ends 114 and 116). In some embodiments, the width function typically varies as a function of the length L, e.g., the value of the width function may be substantially constant along the length La of the first body portion 110*a* and may progressively decrease or taper along the length Lb of the second body portion 110*b*, as best illustrated by FIGS. 1A and 1C. Moreover, in some embodiments, the length function typically varies as a function of the width W, e.g., the value of the length function may be the highest at a central location (e.g., at plane Y-Y) and may progressively decrease from the central location towards either of the opposing lateral sides or surfaces 113 and 115, as best illustrated by FIG. 1A. However, in other embodiments (e.g., 100' of FIG. 1E) the first surface may comprise a generally quadrilateral shaped first body portion 110*a*' and generally quadrilateral shaped second body portion 110*b*' (as illustrated by a top view of another embodiment 100E in FIG. 1E). Here, the width function may be of a substantially constant width along the length of the surface, and the length function may have a substantially constant length value.

In some embodiments, the first surface 111 is symmetric about a plane Y-Y (best understood in light of FIGS. 1A and 1B). In some embodiments, the first surface 111 is symmetric about the plane Y-Y, wherein the plane Y-Y is centrally positioned vertical plane along the width function W of the first surface 111. That said, in other embodiments, it is contemplated that first surface 111 may not be symmetric about the plane Y-Y.

In some embodiments, the second surface 112 is substantially similar (i.e. symmetrical) to the first surface 111 and comprises first and second concave portions (not illustrated) structured to support the corresponding thigh and knee of a second leg of the user (e.g., when the pillow apparatus placed between the two legs of the user), respectively, and comprises a suitable contour/shape. In some embodiments, the second surface 112 is symmetric with the first surface 111 about the horizontal plane X-X (best understood in light of FIGS. 1B and 1C). As such the second surface 112 may be identical to and mirror the first surface 111 (e.g., about the plane X-X, such as a central plane), although in other embodiments, the second surface 112 may be at least partially distinct from the first surface 111.

Moreover, the body portion 110 of the pillow apparatus 100 comprises a first end 114, a second end 116, a first lateral side 113, and a second lateral side 115, each of which extends between and separates the first surface 111 and the second surface 112, by a thickness function T. The value of the thickness function T of the pillow apparatus is defined as the distance (e.g., perpendicular distance) between the first surface 111 and the second surface 112, measured on a plane perpendicular to both the first surface 111 and the second surface 112. Each of the first lateral side 113, first end 114, second lateral side 115 and second end 116 has an edge at the first surface 111 and an opposing edge at the second surface 112 each of which may be defined by a sharp corner, a bevel, a chamfer, a fillet or any other suitable contour between the surface (111, 112) and the respective first lateral side 113, first end 114, second lateral side 115 and second end 116.

In some embodiments, the thickness function T typically varies as a function of the length L (T(L)), e.g., the value of the thickness function may comprise a higher value along the length La of the first body portion 110*a* and may comprise a comparatively lower value along the length Lb of the second body portion 110*b*, as best illustrated by FIGS. 1B and 1C. Moreover, in addition to the length, the thickness function T may also vary as a function of the Width W, e.g., the value of the thickness function T may comprise a higher value proximate the lateral sides 113 and 115, and may progressively decrease to a lower values proximate the central portion (e.g., at the plane Y-Y), as best illustrated by FIGS. 1B and 1D. That said, in some embodiments, as illustrated by FIGS. 1B and 1D, the value of the thickness function T may be a value Tb at the second body portion 110*b* which is lower than a thickness value Ta at the first body portion 110*b*, so as to provide comfortable and optimal separation and support to the knees of the user.

In some embodiments, thickness function T of the pillow body 110 typically varies as a function of the length L and/or the width W, i.e., as T(L, W). For example, the value of the thickness function T may comprise a higher value proximate the lateral sides 113 and 115, and may progressively decrease to a lower values proximate the central portion (e.g., at the plane Y-Y) along the width, as best illustrated by FIGS. 1B and 1D. In some embodiments, thickness values T(Lmax, Wmax) at the outer surfaces, e.g., at the lateral sides 113 and 115, may be referred to as "height(s) H". As such, the thickness function T at the first lateral side 113 defines a first height Ha at the first end 114 of the pillow body 110 and a second height Hb at the second end 116 of the pillow body 110, as best illustrated by FIG. 1C. Here, the first height Ha is typically greater than the second height Hb. For embodiments where the pillow body 110 is symmetric, the second lateral side 115 also defines the first height Ha at the first end 114 of the pillow body 110 and the second height Hb at the second end 116 of the pillow body 110 (not illustrated). That said, in other embodiments, it is contemplated that the thickness of the pillow apparatus may be constant along the length and/or the width of the apparatus 110.

The thickness function T, the length function L, and the width function W are typically structured to provide the first concave portion 111*a* and the second concave portion 111*b*, configured to (i) provide optimal support and stabilize the legs (e.g., thigh portions) of the user, (ii) provide optimal separation of the knees, (iii) provide cushioning of the knees and (iv) provide unrestricted and comfortable hinge movement of the knees (e.g., rotation/pivoting of the lower legs with respect to the thighs).

The pillow body 110 can be constructed using a variety of materials, including synthetic and natural fabrics, foams and other materials and natural/synthetic blends. The pillow body 110 may be made from allergy barrier materials comprising, but not limited to, tightly woven barriers, coated barriers to prevent mold spores, pollen, dust mites, and other contaminants from entering through the pillow body 110. The gauge measurement of the pillow body 110 (i.e., the number of needles per inch or per 1½ inches in a knitting machine) may be large enough to ensure a finer knit.

The filler material of the pillow body 110 provides resiliency and support to the pillow apparatus 100. In other words, the filler material allows the pillow apparatus 100 to conform to the user's shape and is resilient enough to regain its original shape. The filler material can have a shape similar to or different from that of the pillow body 110 and can have similar or different dimensions. The filler material can be fabricated as a single part or multiple parts. In some embodiments the filter material comprises two or more parts. The filler material can be made from one or more materials, including in some embodiments a loose material such as fiber or poly beads. The filler material can comprise polyfiber, reticulated foam, memory foam, hollow petrochemical beads, expanded polystyrene beads or any other natural or synthetic materials that collectively allow the filler material to have the resilient, conforming and supporting properties even after repeated/extended use.

For embodiments utilizing memory foam, the pillow apparatus can be formed of a single continuous piece of foam or multiple pieces of foam that are affixed to one another using adhesive or that retained together by a cover, e.g., shredded foam in a cover. If multiple pieces of foam, the pieces may have two or more different durometers. Similarly, if a single piece, such single piece can be formed by co-molding foam of two or more different durometers. The durometer or durometers of the foam may vary from resilient to compressible.

In some embodiments the filler material and the filter barrier (optionally enclosing the filler material) are made of materials that have a high permeability and high wickability. As used herein, wickability means the ability of a fiber or a fabric to disperse moisture and allow it to pass through to the surface of the fabric, so that evaporation can take place. In some embodiments the filler material and the filter barrier comprise performance fabrics to provide functional qualities like moisture management, UV protection, anti-microbial, thermoregulation and wind and water resistance. In some embodiments the filter barrier comprises a mesh. As used herein, a mesh is a type of fabric characterized by its net-like open appearance, and the spaces between the yarns. In some embodiments the filler material and the filter barrier comprise a bacteriostat, fungal stat or antimicrobial material. As used herein, a bacteriostat means a material that kills the bacteria, slows growth or holding the death to growth rates of bacteria more or less in equilibrium, and/or inhibits bacteria growth. As used herein, a fungal stat means a material that kills the fungus, slows growth or holding the death to growth rates of fungus more or less in equilibrium, and/or inhibits fungus growth.

In other embodiments, the pillow apparatus can include one or more cavities internally that are structured to contain a compressible material, such as a compressible gas (e.g., air or other inert gas) or a compressible liquid. For example, the internal cavity may be lined with polyvinyl chloride and filled with compressible material.

Figure 2A:
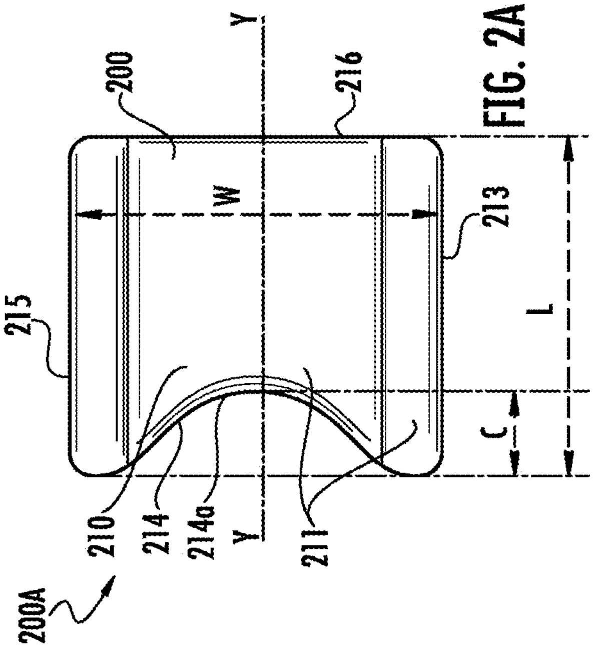
FIGS. 2A-2D illustrate views of a pillow apparatus 200, in accordance with some embodiments of the invention.
Figure 2B:
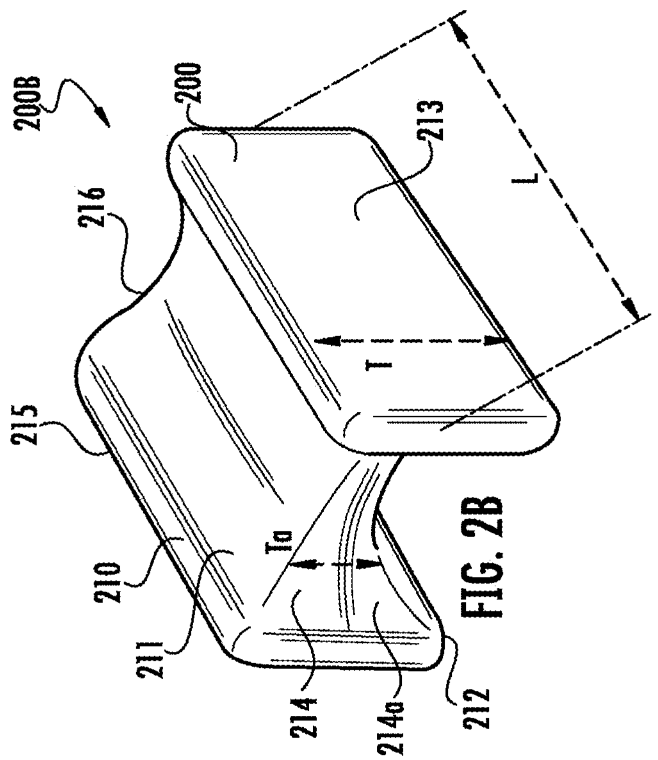
Figure 2C:
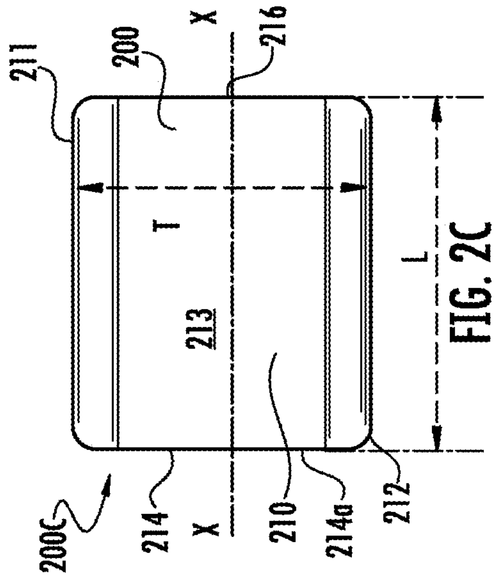
Figure 2D:
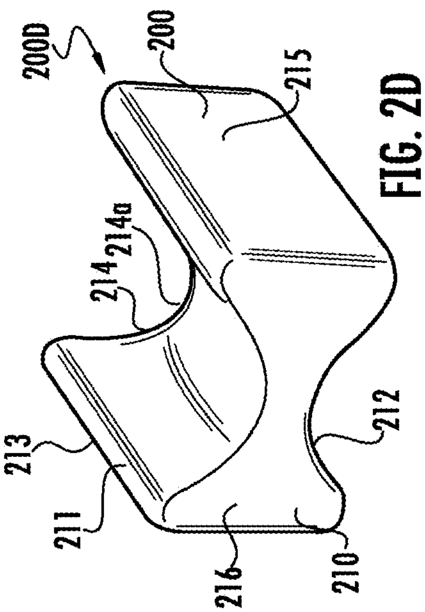

FIGS. 2A-2D illustrate a pillow apparatus 200, in accordance with another embodiment of the invention. The functions and features the pillow apparatus 200 of this embodiment may be substantially similar to those described with respect to FIGS. 1A-1D. The pillow apparatus 200 includes a pillow body 210, as illustrated by FIGS. 2A-2D. FIG. 2A illustrates a lateral view 200A of a pillow apparatus 200. FIG. 2B illustrates a first perspective view 200B (e.g., a front perspective view) of the pillow apparatus 200. In one position/arrangement of the pillow apparatus 200 and/or position of the observer with respect to the pillow apparatus 200, the lateral view 200A of FIG. 2A is a top view of the pillow apparatus 200 (e.g., when viewed from side 211 of FIG. 2B), the side view 200C of FIG. 2C is a right side view of the pillow apparatus 200 (e.g., when viewed from side 213 of FIG. 2B), and the second perspective view 200D of FIG. 2D is a rear perspective view of the pillow apparatus 200 (e.g., when viewed from end 216 of FIG. 2B).

Referring to FIGS. 2A-2D, the pillow body 210 of the pillow apparatus 200 comprises a first surface 211 and an opposite second surface 212, similar to the first surface 111 and second surface 112 described previously. Moreover, the pillow body 210 of the pillow apparatus 200 comprises a first end 214, a second end 216, a first lateral side 213, and a second lateral side 215, each of which extends between and separates the first surface 211 and the second surface 212. Each of the first lateral side 213, first end 214, second lateral side 215 and second end 216 has an edge at the first surface 211 and an opposing edge at the second surface 212 each of which may be defined by a sharp corner, a bevel, a chamfer, a fillet or any other suitable contour between the surface (211, 212) and the respective first lateral side 213, first end 214, second lateral side 215 and second end 216, similar to the embodiments described previously. The pillow body 210 is structured to support the thighs of the user when the user places the pillow apparatus 200 between the user's legs, for example, during a side sleeping position.

The pillow body 210 of the pillow apparatus 200 comprises a first lateral depression **214*a* (also referred to as a lateral concave portion 214*a*) at the first end 214. The first lateral depression 214*a* is shaped, dimensioned and otherwise structured to comfortably support, cushion or otherwise accommodate the pelvis (e.g., crotch region or genital region of the user), when the user places the pillow apparatus 200 between the user's legs, for example, during a side sleeping position. The first lateral depression 214*a* may be a suitable three-dimensional concave or curvilinear shape (e.g., a parabolic shape, a semi-circular shape, etc.). In some embodiments, the first lateral depression 214*a* comprises a depth C at a central location proximate the plane Y-Y, which may progressively decrease towards the sides 215 and 213 of the pillow body 210. In some embodiments, at the first lateral depression 214*a*, the pillow body 210 may comprise a thickness Ta perpendicular to the depth C, a central location proximate the plane X-X, which may progressively increase towards the sides 213 and 215 of the pillow body 210** as illustrated, or may remain constant.

In some embodiments, the pillow body 210 is symmetric about a plane Y-Y (best understood in light of FIGS. 2A and 2B), wherein the plane Y-Y is centrally positioned vertical plane between the lateral sides 213 and 215. That said, in other embodiments, it is contemplated that pillow body 210 may not be symmetric about the plane Y-Y. In some embodiments, the pillow body 210 is symmetric about a plane X-X (best understood in light of FIGS. 2B and 2C), wherein the plane X-X is centrally positioned vertical plane between the sides 211 and 212, so as to optimally support both legs of the user. That said, in other embodiments, it is contemplated that pillow body 210 may not be symmetric about the plane X-X.

As described previously, the first surface 211 may be dimensioned by a width function W and a length function L. In some embodiments, the width function W is typically constant along the length of the apparatus 200 (as best illustrated in FIG. 2A), or alternatively, the width W may vary along the length L of the apparatus 200. Moreover, in some embodiments, the length function typically varies as a function of the width W, e.g., the value of the length function may be the lowest at a central location (e.g., value L-C at plane Y-Y) and may progressively increase towards the ends of the first surface 211, to form the depression **214*a* as best illustrated by FIG. 2A. In some embodiments, thickness function T of the pillow body 210 typically varies as a function of the length L and/or the width W (T(L, W)). For example, the value of the thickness function T may comprise a higher value proximate the lateral sides 213 and 215, and may progressively decrease to a lower values proximate the central portion (e.g., at the plane Y-Y) along the width, as best illustrated by FIGS. 2B and 2D. As another example, the value of the thickness may vary along the length of the pillow body 210 or it may remain constant. The thickness function T, the length function L, and the width function W are typically structured to provide concave portions at the first and second surfaces (211, 212) configured to provide optimal support and stabilize the legs (e.g., thigh portions) of the user, and provide the first lateral depression 214***a* to comfortably accommodate the lower pelvis of the user.

Figure 3B:
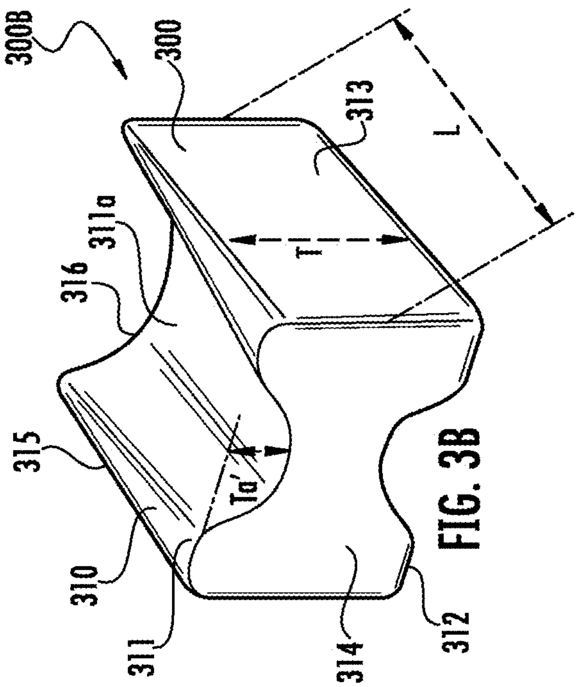
FIGS. 3A-3D illustrate views of a pillow apparatus 300, in accordance with some embodiments of the invention.
Figure 3D:
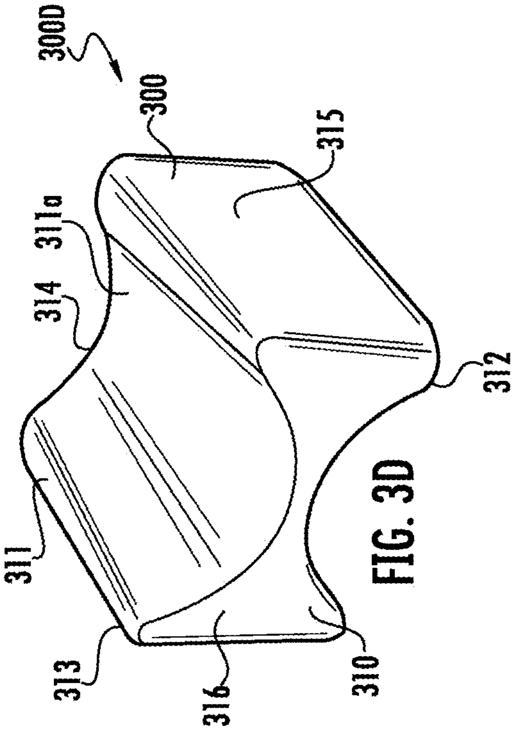
Figure 3A:
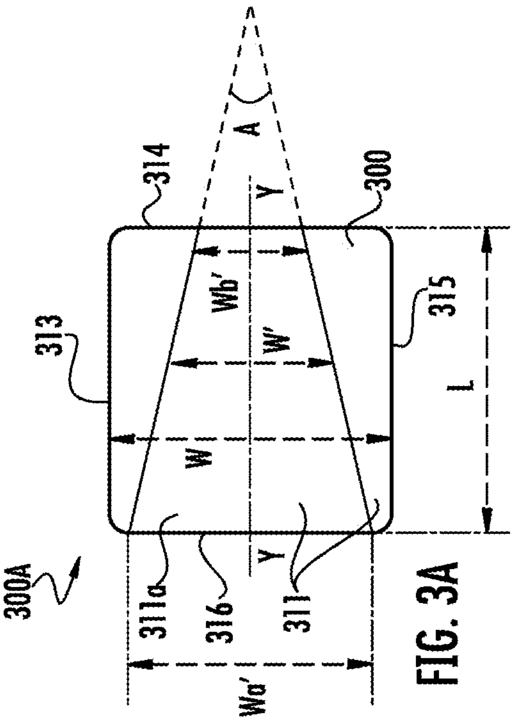
Figure 3C:
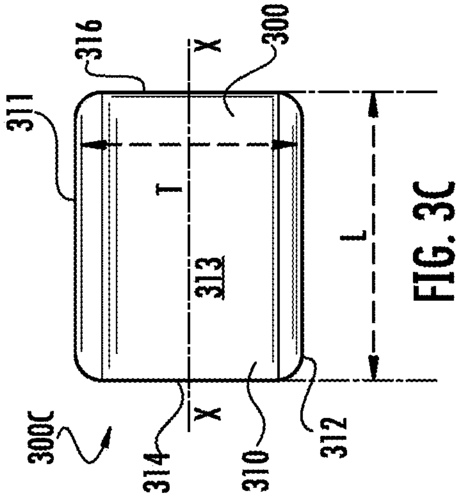

FIGS. 3A-3D illustrate a pillow apparatus 300, in accordance with another embodiment of the invention. The functions and features the pillow apparatus 300 of this embodiment may be substantially similar to those described with respect to FIGS. 1A-1D, and 2A-2D. The pillow apparatus 300 includes a pillow body 310, as illustrated by FIGS. 3A-3D. FIG. 3A illustrates a lateral view 300A of a pillow apparatus 300. FIG. 3B illustrates a first perspective view 300B (e.g., a front perspective view) of the pillow apparatus 300. In one position/arrangement of the pillow apparatus 300 and/or position of the observer with respect to the pillow apparatus 300, the lateral view 300A of FIG. 3A is a top view of the pillow apparatus 300 (e.g., when viewed from side 311 of FIG. 3B), the side view 300C of FIG. 3C is a right side view of the pillow apparatus 300 (e.g., when viewed from side 313 of FIG. 3B), and the second perspective view 300D of FIG. 3D is a rear perspective view of the pillow apparatus 300 (e.g., when viewed from end 316 of FIG. 3B).

Referring to FIGS. 3A-3D, the pillow body 310 of the pillow apparatus 300 comprises a first surface 311 and an opposite second surface 312, similar to the first surface (111, 211) and second surface (112, 212) described previously. Moreover, the body portion 310 of the pillow apparatus 300 comprises a first end 314, a second end 316, a first lateral side 313, and a second lateral side 315, each of which extends between and separates the first surface 311 and the second surface 312. Each of the first lateral side 313, first end 314, second lateral side 315 and second end 316 has an edge at the first surface 311 and an opposing edge at the second surface 312 each of which may be defined by a sharp corner, a bevel, a chamfer, a fillet or any other suitable contour between the surface (311, 312) and the respective first lateral side 313, first end 314, second lateral side 315 and second end 316, similar to the embodiments described previously. The pillow body 310 (and specifically the concave taper portion 311*a*) is structured to support the thighs of the user when the user places the pillow apparatus 300 between the user's legs, for example, during a side sleeping position.

The pillow body 310 of the pillow apparatus 300 comprises a concave taper portion 311*a* (also referred to as a concave depression portion 311*a*) at the first surface 311 and another at the second surface 312 (not illustrated). The concave taper portion 311*a* is shaped, dimensioned and otherwise structured to receive and at least partially surround a thigh of a user (e.g., thigh of a first leg when the pillow apparatus is placed between the two legs of the user). The concave taper portion 311*a* comprises a width function W'. The width W' of the concave taper portion 311*a* may be different from the width W of the pillow body 310 itself. Specifically, the concave taper portion 311*a* comprises a taper with a decreasing width from Wa' at the second end 316 (structured to be positioned proximate the user's knee) to width Wb' at the first end 314 (structured to be positioned proximate the user's thighs/lower pelvis). The taper is structured to comfortably support the thigh of the user and the increased width Wa' at the portion proximate the user's knee is structured to allow for unhindered hinge movement of the user's knee. The taper of the concave taper portion 311*a* may define an angle A, as best illustrated by FIG. 3A. In some embodiments, the concave portion is symmetric about the plane Y-Y. In some embodiments, the widths Wa' and/or Wb' the concave taper portion 311*a* are the highest proximate the corresponding first surface 111 or second surface 112, which progressively decrease towards the inner portion of the pillow body 310, forming a curved (e.g., parabolic or semi-circular, etc.) cross section (best illustrated by FIG. 3B). In some embodiments, the concave taper portion 311*a* comprises a depth Ta' perpendicular to the depths Wa' and/or Wb', a central location proximate the plane X-X, which may progressively decrease towards the lateral sides 313 and 315 of the pillow body 310 (best illustrated by FIG. 3B).

In some embodiments, the pillow body 310 is symmetric about a plane Y-Y (best understood in light of FIGS. 3A and 3B), wherein the plane Y-Y is centrally positioned vertical plane between the lateral sides 313 and 315. That said, in other embodiments, it is contemplated that pillow body 310 may not be symmetric about the plane Y-Y. In some embodiments, the pillow body 310 is symmetric about a plane X-X (best understood in light of FIGS. 3B and 3C), wherein the plane X-X is centrally positioned vertical plane between the sides 311 and 312, so as to optimally support both legs of the user. That said, in other embodiments, it is contemplated that pillow body 310 may not be symmetric about the plane X-X.

As described previously, the first surface 311 may be dimensioned by a width function W and a length function L. In some embodiments, the width function W and the length function L are typically constant for the apparatus 300 (as best illustrated in FIG. 3A), or alternatively, the width W and/or the length L may vary. In some embodiments, thickness function T of the pillow body 310 typically varies as a function of the length L and/or the width W, to form the concave taper portion 311*a*. The thickness function T, the length function L, and the width function W are typically structured to provide concave taper portions at the first and second surfaces (311, 312) configured to provide optimal support and stabilize the thighs of the user, and provide an increased depression volume proximate the user's knee to allow for unrestricted hinge movement of the user's knee.

That said, in some embodiments, the concave taper portion 311*a* may be shaped, dimensioned and otherwise structured such that the width Wa at the second end 316 is lesser than or equal to width Wb at the first end 314 (structured to be positioned proximate the user's thighs/lower pelvis).

Figure 4A:
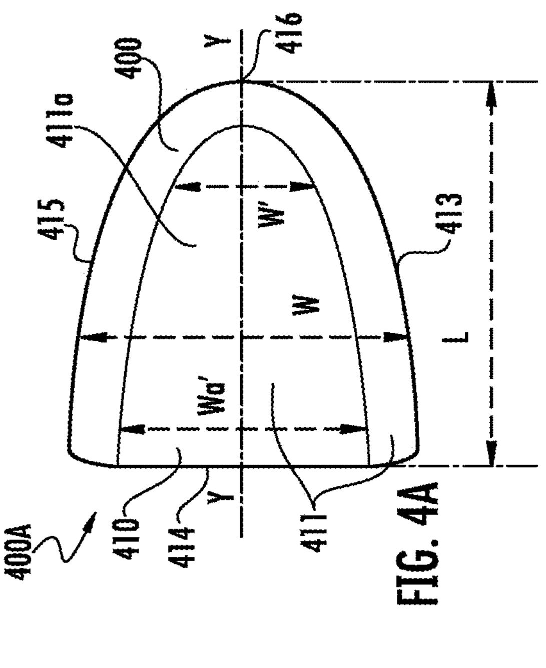
FIGS. 4A-4D illustrate views of a pillow apparatus 400, in accordance with some embodiments of the invention.
Figure 4B:
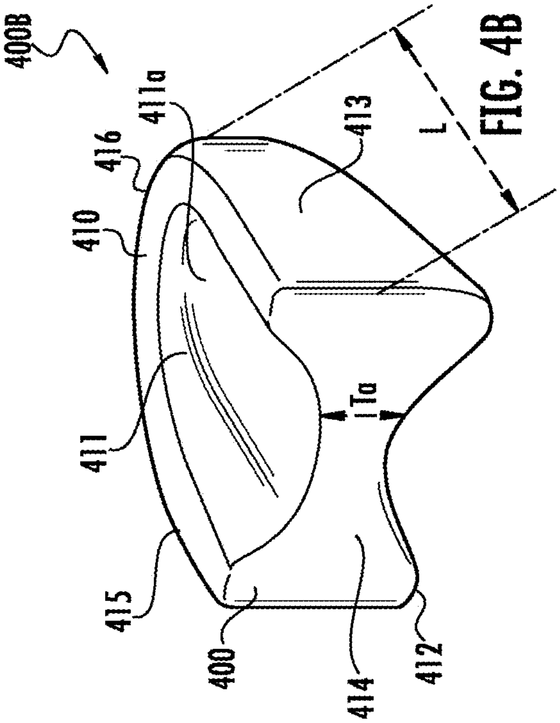
Figure 4C:
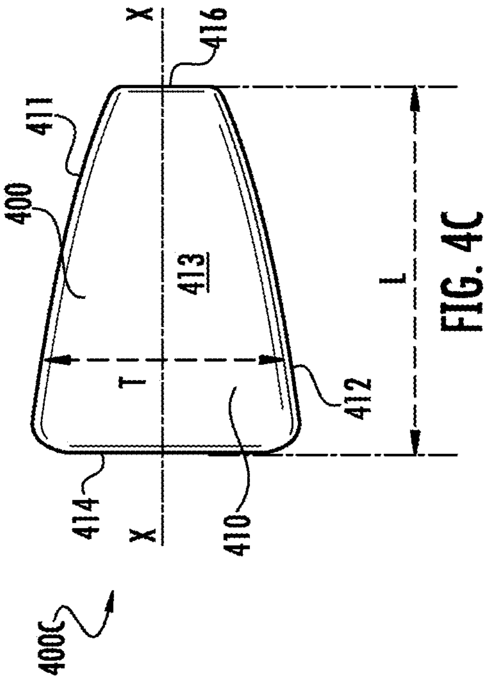
Figure 4D:
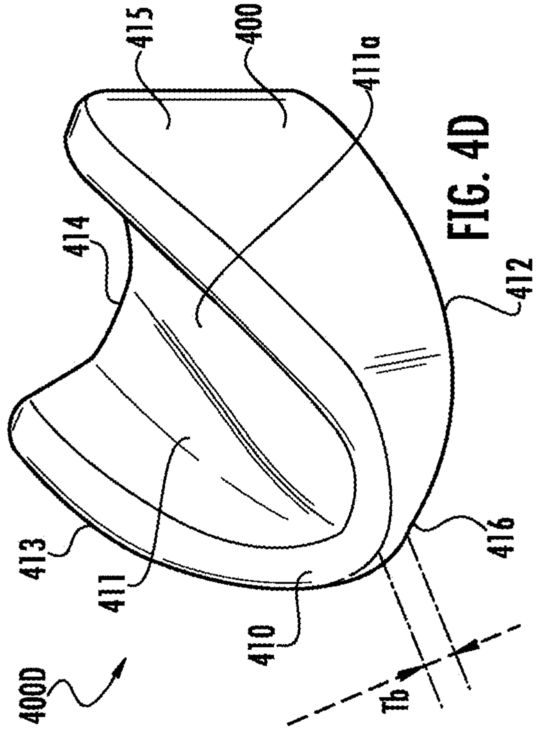

FIGS. 4A-4D illustrate a pillow apparatus 400, in accordance with yet another embodiment of the invention. The functions and features the pillow apparatus 400 of this embodiment may be substantially similar to those described with respect to FIGS. 1A-1D, 2A-2D and 3A-3D. The pillow apparatus 400 includes a pillow body 410, as illustrated by FIGS. 4A-4D. FIG. 4A illustrates a lateral view 400A of a pillow apparatus 400. FIG. 4B illustrates a first perspective view 400B (e.g., a front perspective view) of the pillow apparatus 400. In one position/arrangement of the pillow apparatus 400 and/or position of the observer with respect to the pillow apparatus 400, the lateral view 400A of FIG. 4A is a top view of the pillow apparatus 400 (e.g., when viewed from side 411 of FIG. 4B), the side view 400C of FIG. 4C is a right side view of the pillow apparatus 400 (e.g., when viewed from side 413 of FIG. 4B), and the second perspective view 400D of FIG. 4D is a rear perspective view of the pillow apparatus 400 (e.g., when viewed from end 416 of FIG. 4B).

Referring to FIGS. 4A-4D, the body portion 410 of the pillow apparatus 400 comprises a first surface 411 and an opposite second surface 412, similar to the first surface (111, 211, 311) and second surface (112, 212, 312) described previously. Moreover, the pillow body 410 of the pillow apparatus 400 comprises a first end 414, a second end 416, a first lateral side 413, and a second lateral side 415, each of which extends between and separates the first surface 411 and the second surface 412. Each of the first lateral side 413, first end 414, second lateral side 415 and second end 416 has an edge at the first surface 411 and an opposing edge at the second surface 412 each of which may be defined by a sharp corner, a bevel, a chamfer, a fillet or any other suitable contour between the surface (411, 412) and the respective first lateral side 413, first end 414, second lateral side 415 and second end 416, similar to the embodiments described previously. The first and second surfaces (411, 412) may have a curved perimeter (e.g., a parabolic contour) at the side 413, end 416, and side 415, collectively in combination. The pillow body 410 (and specifically the concave taper portion 411*a*) is structured to support the thighs of the user when the user places the pillow apparatus 400 between the user's legs, for example, during a side sleeping position, and the decreased thickens and decreased volume (e.g., parabolic vertex portion, or parabolic portion) at the second end 416, allows the user to bend the knee and assume a fetal position comfortably, without interference of the user's calves. In some embodiments, the second end 416 comprises a parabolic contour. The parabolic contour may comprise at least a portion of a circular or semi-circular contour, at least a portion of a parabolic contour, at least a portion of a conic section contour, at least a portion of a curvilinear contour, and/or a suitable combination.

The pillow body 410 of the pillow apparatus 400 comprises a concave taper portion 411*a* (also referred to as a concave depression portion 411*a*) at the first surface 411 and another at the second surface 412 (not illustrated). The concave taper portion 411*a* is shaped, dimensioned and otherwise structured to receive and at least partially surround a thigh of a user (e.g., thigh of a first leg when the pillow apparatus is placed between the two legs of the user). The concave taper portion 411*a* comprises a width function W'. The width W' of the concave taper portion 411*a* may be different from the width W of the pillow body 410 itself. Specifically, the concave taper portion 411*a* comprises a taper with a decreasing width from Wa' at first end 414 (structured to be positioned proximate the user's thighs/lower pelvis) to the second end 416 (structured to be positioned proximate the user's knee). The taper is structured to comfortably support the thigh of the user and the decreased width and taper of the vertical wall (thickness Ta proximate the thighs is higher than the thickness Tb proximate the knee) at the portion proximate the user's knee (the second end 416, e.g., having a parabolic contour such as a circular or semi-circular contour, a parabolic/conic section contour etc.) is structured to allow for unhindered hinge movement of the user's knee and allows the user to comfortably assume a fetal position without the interference of the calves. In some embodiments, the concave portion is symmetric about the plane Y-Y. In some embodiments, the width W of the concave taper portion 411*a* is the highest proximate the corresponding top edge of the first surface 410 or second surface 412, which progressively decrease towards the inner portion of the pillow body 410, forming a curved (e.g., parabolic or semi-circular, etc.) cross section (best illustrated by FIG. 4B).

In some embodiments, the pillow body 410 is symmetric about a plane Y-Y (best understood in light of FIGS. 4A and 4B), wherein the plane Y-Y is centrally positioned vertical plane between the lateral sides 413 and 415. That said, in other embodiments, it is contemplated that pillow body 410 may not be symmetric about the plane Y-Y. In some embodiments, the pillow body 410 is symmetric about a plane X-X (best understood in light of FIGS. 4B and 4C), wherein the plane X-X is centrally positioned vertical plane between the sides 411 and 412, so as to optimally support both legs of the user. That said, in other embodiments, it is contemplated that pillow body 410 may not be symmetric about the plane X-X.

As described previously, the first surface 411 may be dimensioned by a width function W and a length function L. In some embodiments, the width function W and the length function L are typically vary to form a curved shape (e.g., paraboloid shape) with lower volume of material proximate the second end 416 (as best illustrated in FIG. 4A), or alternatively, the width W and/or the length L may be constant. In some embodiments, thickness function T of the pillow body 410 typically varies as a function of the length L and/or the width W, to form the concave taper portion 411*a*. The thickness function T, the length function L, and the width function W are typically structured to provide concave taper portions at the first and second surfaces (411, 412) configured to comfortably support the thigh of the user and the decreased material/volume at the portion proximate the user's knee (the second end 416) is structured to allow for unhindered hinge movement of the user's knee and allows the user to comfortably assume a fetal position without the interference of the calves.

Figures 5A, 5B, 5C, 5D, 5E:
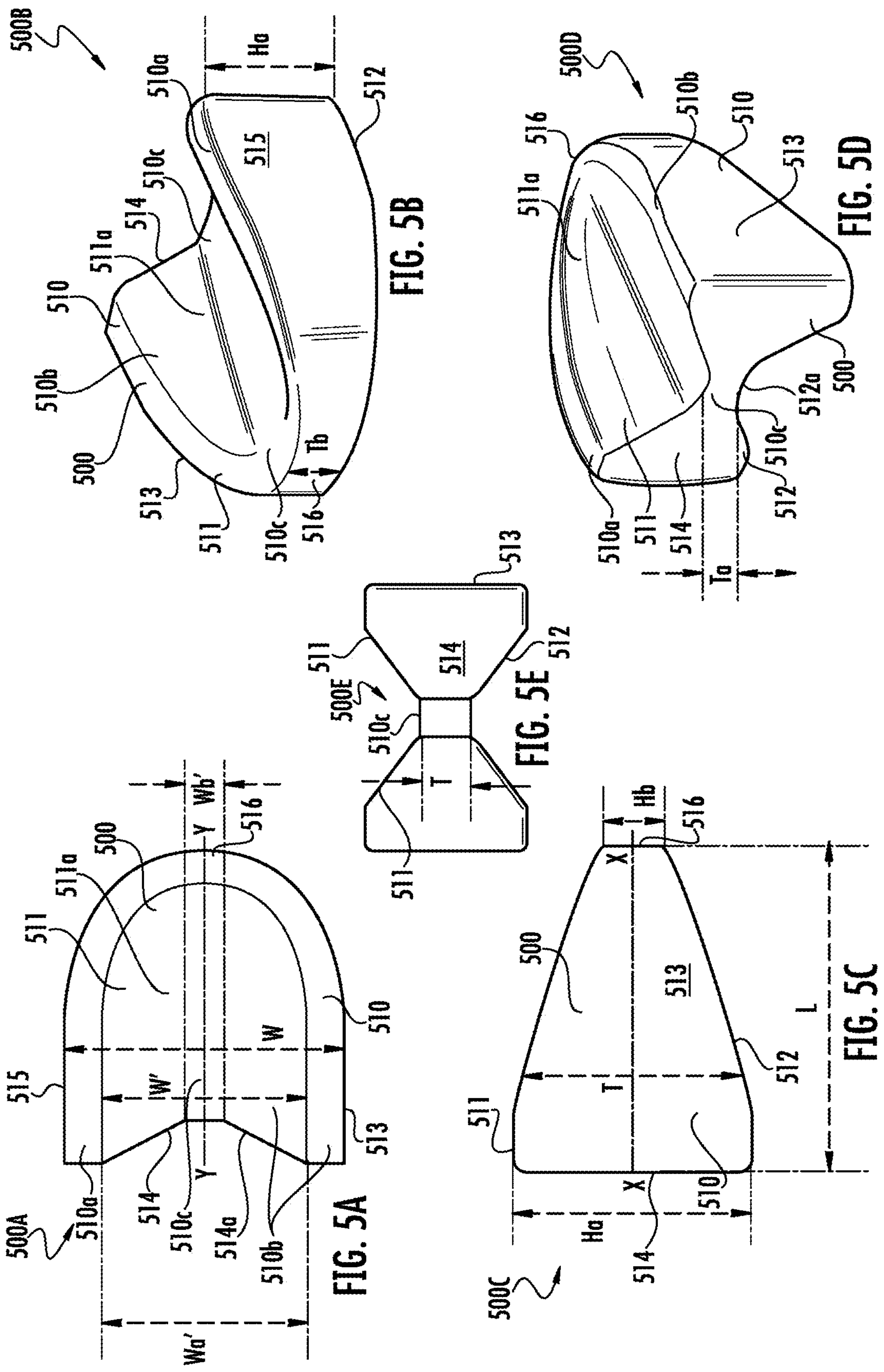
FIGS. 5A-5E illustrate views of a pillow apparatus 500, in accordance with some embodiments of the invention.

FIGS. 5A-5E illustrate a pillow apparatus 500, in accordance with yet another embodiment of the invention. The functions and features the pillow apparatus 500 of this embodiment are substantially similar to those described with respect to FIGS. 4A-4D. The pillow apparatus 500 includes a pillow body 510, as illustrated by FIGS. 5A-5E. FIG. 5A illustrates a lateral view 500A of a pillow apparatus 500. FIG. 5B illustrates a first perspective view 500B (e.g., a rear perspective view) of the pillow apparatus 500. In one position/arrangement of the pillow apparatus 500 and/or position of the observer with respect to the pillow apparatus 500, the lateral view 500A of FIG. 5A is a top view of the pillow apparatus 500 (e.g., when viewed from side 511 of FIG. 5B), the side view 500C of FIG. 5C is a right side view of the pillow apparatus 500 (e.g., when viewed from side 513 of FIG. 5B), the second perspective view 500D of FIG. 5D is a front perspective view of the pillow apparatus 500 (e.g., when viewed from end 514 of FIG. 5B). End side view 500E of FIG. 5E is a side view of the pillow apparatus 500 (e.g., when viewed from end 514 of FIG. 5B).

Referring to FIGS. 5A-5E, the body portion 510 of the pillow apparatus 500 comprises a first surface 511 and an opposite second surface 512, similar to the first surface 411 and second surface 412 described previously. In some embodiments, the first surface 511 is symmetric about a plane Y-Y (best understood in light of FIG. 5A). In some embodiments, the first surface 511 is symmetric about the plane Y-Y, wherein the plane Y-Y is centrally positioned vertical plane along a width function W of the first surface 511. That said, in other embodiments, it is contemplated that first surface 511 may not be symmetric about the plane Y-Y. In some embodiments, the second surface 512 is symmetric with the first surface 511 about the horizontal plane X-X (best understood in light of FIG. 5C). As such the second surface 512 may be identical to and mirror the first surface 511 (e.g., about the plane X-X, such as a central plane). That said, it is contemplated that in other embodiments, the second surface 512 may be at least partially distinct from the first surface 511.

Moreover, the body portion 510 of the pillow apparatus 500 comprises a first end 514, a second end 516, a first lateral side 513, and a second lateral side 515, each of which extends between and separates the first surface 511 and the second surface 512. In other words, FIGS. 5A-5E illustrate the pillow body 510 having the first end 514, the second end 516, the first lateral side 513, the second lateral side 515, the first surface 511 extending between the first end 514 and second end 516 and the first lateral side 513 and the second lateral side 515. The figures further illustrate the pillow body 510 having a second surface 512 extending between the first end 514 and second end 516 and the first lateral side 513 and the second lateral side 515. Moreover, each of the first lateral side 513, first end 514, second lateral side 515 and second end 516 may have an edge at the first surface 511 and an opposing edge at the second surface 512 each of which may be defined by a sharp corner, a bevel, a chamfer, a fillet or any other suitable contour between the surface (511, 512) and the respective first lateral side 513, first end 514, second lateral side 515 and second end 516, similar to the embodiments described previously. The first and second surfaces (511, 512) may have a curved perimeter (e.g., a parabolic contour) at the side 513, end 516, and side 515, collectively in combination. The pillow body 510 (and specifically the concave depressions (511*a*, 512*a*) described below) is structured to support the thighs of the user when the user places the pillow apparatus 500 between the user's legs, for example, during a side sleeping position, and the decreased thickens and decreased volume (e.g., parabolic vertex portion or parabolic portion) at the second end 516, allows the user to bend the knee and assume a fetal position comfortably, without interference of the user's calves.

In some embodiments, the pillow body 510 of the pillow apparatus 500 comprises a first raised portion or sidewall 510*a* at the first surface 511 substantially along the second lateral side 515 and another second raised portion or sidewall 510*b* at the first surface 511 substantially along the first lateral side 513. The first raised portion 510*a* and the second raised portion 510*b* are typically separated by a transition portion 510*c*. Corresponding raised portions and transition portion 510*c* may also be provided on the second surface 512. The first raised portion 510*a* and the second raised portion 510*b* together with the transition portion 510*c* are shaped, dimensioned and otherwise structured to receive and at least partially surround a thigh or calf of a user (e.g., thigh of a first leg when the pillow apparatus is placed between the two legs of the user or calf when placed around the ankle region). The transition portion 510*c* may comprise a suitable straight or curved cross-section (e.g., at the first surface 511 and/or the second surface 512). Moreover, a width of the transition portion 510*c* (e.g., measured along a direction perpendicular to the sides 513 and 515) may be constant or may vary along the length from the ends 514 and 516. For instance, in some embodiments, the width of the transition portion 510*c* is greater approximate the first end 514 than proximate the second end 516, while in other embodiments the width of the transition portion 510*c* is constant from the first end 514 to the second end 516. Moreover, in some embodiments the transition portion 510*c* may have different material properties (e.g., stiffness, compressibility, elasticity, resilience and the like) in comparison with the first raised portion 510*a* and/or the second raised portion 510*b*, while in other embodiments the first and second raised portions (510*a*, 510*b*) and the transition portion 510*c* comprise the same material properties. The thickness of the first raised portion 510*a* and the second raised portion 510*b* may taper symmetrically or non-symmetrically by decreasing in thickness from the transition portion 510*c* towards the distal edge of the corresponding first raised portion 510*a* and second raised portion 510*b*.

As illustrated by FIGS. 5A-5D, the pillow body 510 of the pillow apparatus 500 comprises a concaved surface 514*a* (also referred to as a lateral depression 514*a*) at the first end 514. The first lateral depression 514*a* may be similar to the first lateral depression 214*a* of pillow apparatus 200 described previously. In some embodiments, the first lateral depression 514*a* may be shaped, dimensioned and otherwise structured to comfortably support, cushion or otherwise accommodate the pelvis (e.g., crotch region or genital region of the user), when the user places the pillow apparatus 500 between the user's legs, for example, during a side sleeping position. In some embodiments, the first lateral depression 514*a* may be a suitable three-dimensional concave or curvilinear shape (e.g., a parabolic shape, a semi-circular shape, etc.). In some embodiments, the first lateral depression 514*a* comprises maximum depth at a central location proximate the plane Y-Y, which may progressively decrease towards the sides 515 and 513 of the pillow body 510.

As such, similar to the embodiments described previously, the first surface 511 (and/or the second surface 512) may be dimensioned by a width function W and a length function L. In some embodiments, the value of the width function W of the pillow apparatus is defined as the distance between a first pair of opposing ends of the first surface 511 (e.g., perpendicular distance between opposing lateral sides or surfaces 513 and 515 which terminate the first surface, as will be described below, measured on a plane perpendicular to both the lateral sides or surfaces 513 and 515). In some embodiments, the value of the length function L of the pillow apparatus is defined as the distance between a second pair of opposing ends of the first surface 511 (e.g., perpendicular distance between opposing ends 514 and 516 which terminate the first surface, as will be described below, measured on a plane perpendicular to both the ends 514 and 516). In some embodiments, the width function typically varies as a function of the length L, as best illustrated by FIG. 5A 5C. Moreover, in some embodiments, the length function typically varies as a function of the width W, e.g., the value of the length function may be the highest at a central location (e.g., at plane Y-Y) and may progressively decrease from the central location towards either of the opposing lateral sides or surfaces 513 and 515, as best illustrated by FIG. 5A. In some embodiments, the second surface 512 is substantially similar (i.e. symmetrical) to the first surface 511.

The pillow body 510 of the pillow apparatus 500 comprises a first concave depression 511*a* (also referred to as a concave taper portion 511*a*) at the first surface 511 and another second concave depression 512*a* at the second surface 512. The first concave depression 511*a* comprises a width function W'. The width W' of the first concave depression 511*a* may be different from the width W of the pillow body 510 itself. Specifically, the first concave depression 511*a* is tapered with a decreasing width from Wa' at the first end 514 (e.g., structured to be positioned proximate the user's thighs/lower pelvis) to width Wb' at the second end 516 (e.g., structured to be positioned proximate the user's knee). In other words, the first concave depression 511*a* defines a first width Wa' at the first end 514 and a second width Wb' at the second end 516, such that the first width Wa' is greater than the second width Wb'. Here, in some embodiments, the width W' of the first concave depression 511*a* tapers continuously from the first end 514 to the second end 516, and/or in other embodiments, the width W' of the first concave depression 511*a* tapers discontinuously from the first end 514 to the second end 516. As used herein, "discontinuously" means that the taper is not a linear, gradual or continuous taper, but rather is stepped, abrupt, non-linear or otherwise non-congruous.

Similarly, the second concave depression 512*a* positioned on the second surface 512 of the pillow body 510 may define a first width Wa' at the first end 514 and a second width Wb' at the second end 516 such that the first width Wa' is greater than the second width Wb'. Moreover, in some embodiments, the width W' of the second concave depression 512*a* may taper continuously from the first end 514 to the second end 516, and/or in other embodiments, the width W' of the second concave depression 512*a* may taper discontinuously from the first end 514 to the second end 516.

In some embodiments, the concave depressions (511*a*, 512*a*) are symmetric about the plane Y-Y. In some embodiments, the widths Wa' and/or Wb' the first concave depression 511*a* are the highest proximate the corresponding first surface 111 or second surface 112, which progressively decrease towards the inner portion of the pillow body 510, forming a curved (e.g., parabolic, elliptical, semi-circular, or a another depression contour etc.) cross section (best illustrated by FIG. 5B). Here, the pillow body 510 defines (i) a first minimum thickness Ta at the first end 514 between the first surface 511 and the second surface 512 of the pillow body 510 (e.g., at a central location proximate the plane X-X) and (ii) a second minimum thickness Tb at the second end 516 between the first surface 511 and the second surface 512 of the pillow body 510 (e.g., at a central location proximate the plane X-X). Here, the first minimum thickness Ta is typically less than the second minimum thickness Tb.

As such, in some embodiments, for a given width location, a comparatively smaller thickness T (e.g., measured perpendicular to the depths Wa' and/or Wb') may be present at a central location proximate the plane X-X, which may progressively increase towards the lateral sides 513 and 515 of the pillow body 510 to define corresponding heights H, as described below.

The value of the thickness function T of the pillow apparatus is defined as the distance (e.g., perpendicular distance) between the first surface 511 and the second surface 512, measured on a plane perpendicular to both the first surface 511 and the second surface 512. In some embodiments, thickness function T of the pillow body 510 typically varies as a function of the length L and/or the width W, i.e., as T(L, W). For example, the value of the thickness function T may comprise a higher value proximate the lateral sides 513 and 515, and may progressively decrease to a lower values proximate the central portion (e.g., at the plane Y-Y) along the width, as best illustrated by FIGS. 5B and 5D. In some embodiments, thickness values T(Lmax, Wmax) at the outer surfaces, e.g., at the lateral sides 513 and 515, may be referred to as "height(s) H". As such, the thickness function T at the first lateral side 513 defines a first height Ha at the first end 514 of the pillow body 510 and a second height Hb at the second end 516 of the pillow body 510, as best illustrated by FIG. 5C. Here, the first height Ha is typically greater than the second height Hb. Because the pillow body 510 is typically symmetric, similarly, the second lateral side 515 may define the first height Ha at the first end 514 of the pillow body 510 and the second height Hb at the second end 516 of the pillow body 510 (not illustrated), such that the first height Ha is greater than the second height Hb. That said, in other embodiments, it is contemplated that the thickness of the pillow apparatus may be constant along the length and/or the width of the apparatus 510. Here, in some embodiments, the height of the first lateral side 513 and the second lateral side 515 tapers gradually from the first end 514 to the second end 516, or while in other embodiments, height of the first lateral side 513 and the second lateral side 515 tapers discontinuously from the first end 514 to the second end 516.

Figure 6A:
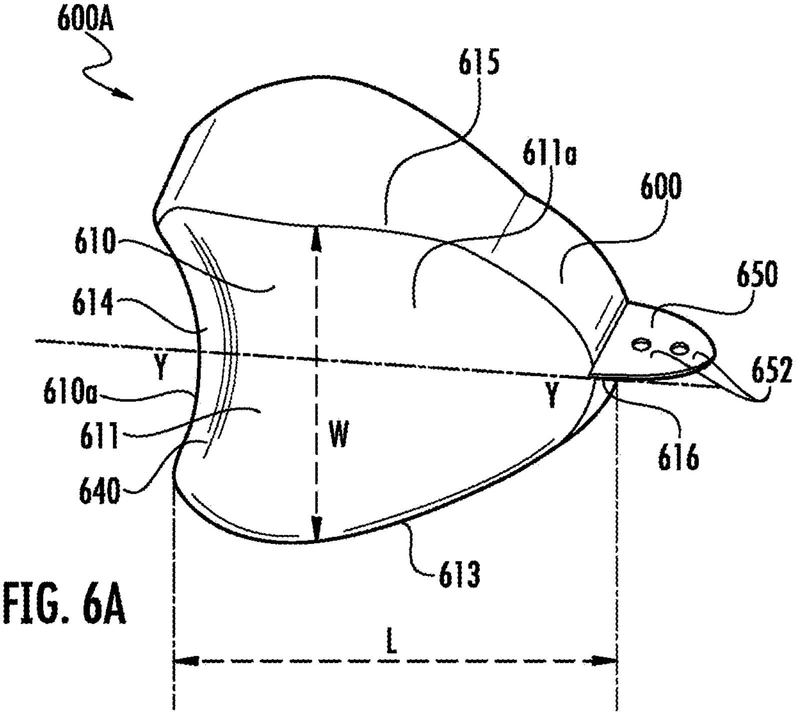
FIGS. 6A-6B illustrate views of a pillow apparatus 600, in accordance with some embodiments of the invention.
Figure 6B:
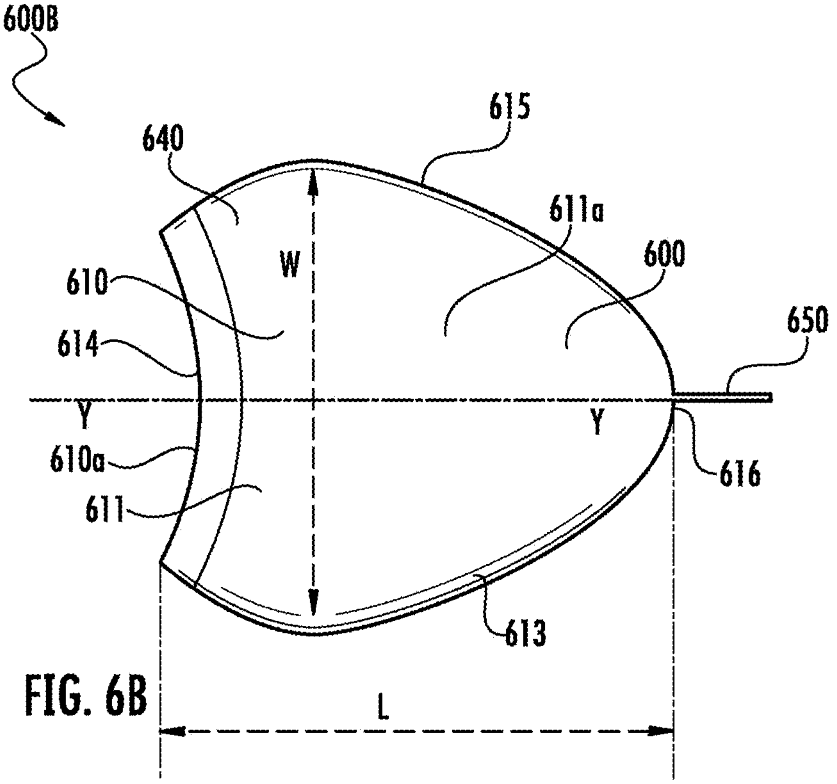

FIGS. 6A-6B illustrate a pillow apparatus 600, in accordance with yet another embodiment of the invention. The functions and features the pillow apparatus 600 of this embodiment may be substantially similar to those described previously (Pillow apparatuses 100-500), a particularly with respect to the pillow apparatus of FIGS. 4A-4D, except that the pillow apparatus 600 comprises a coupling member 650, as will be described in detail below. That said, the coupling member 650 or other coupling members described later on (750-1150) may be suitably provided on any of the pillow apparatuses 100-500 described previously. The pillow apparatus 600 includes a pillow body 610, as illustrated by FIGS. 6A-6B. FIG. 6A illustrates a first perspective view 600A (e.g., a top perspective view) of the pillow apparatus 600. FIG. 6B illustrates a lateral view 600B (e.g., a top view) of the pillow apparatus 600, when viewed from the side 611. The pillow apparatus 640 comprises a cover 640 at least partially or fully surrounding the pillow body. In some embodiments, the cover may include an opening, e.g., on the side of the cover corresponding to the first end 614 of the pillow so that the pillow can be inserted into and removed from the cover.

Referring to FIGS. 6A-6B, the body portion 610 of the pillow apparatus 600 comprises a first surface 611 and an opposite second surface 612, similar to the first surfaces (111-511) and second surfaces (112-512) described previously. Moreover, the body portion 610 of the pillow apparatus 600 comprises a first lateral side 613, a first end 614, a second lateral side 615 and a second end 616, each of which extends between and separates the first surface 611 and the second surface 612. Each of the first lateral side 613, first end 614, second lateral side 615 and second end 616 has an edge at the first surface 611 and an opposing edge at the second surface 612 each of which may be defined by a sharp corner, a bevel, a chamfer, a fillet, a curve, or any other suitable contour between the surface (611, 612) and the respective first lateral side 613, first end 614, second lateral side 615 and second end 616, similar to the embodiments described previously. The first and second surfaces (611, 612) may have a curved perimeter (e.g., a parabolic contour) at the side 613, end 616, and side 615, collectively in combination.

The pillow body 610 (and specifically the concave depressions (611*a*, 612*a*)) is structured to support the thighs of the user when the user places the pillow apparatus 600 between the user's legs, for example, during a side sleeping position, and the decreased thickens and decreased volume (e.g., parabolic vertex portion, or parabolic portion) at the second end 616, allows the user to bend the knee and assume a fetal position comfortably, without interference of the user's calves. In other embodiments, when used between crus leg parts (i.e., between the knee and foot portion of the user's leg, or calf portion), the pillow body 610 is structured to support at least a portion of a crus leg part of the user when the user places the pillow apparatus 600 between the user's legs at a position between the knee and foot (e.g., between the user's calves), for example, during a side sleeping position, with the second end 616 facing the user's knees.

In some embodiments, the second end 616 comprises a parabolic contour. The parabolic contour may comprise at least a portion of a circular or semi-circular contour, at least a portion of a parabolic contour, at least a portion of a conic section contour, at least a portion of a curvilinear contour, and/or a suitable combination. The pillow body 610 of the pillow apparatus 600 comprises a concave portion 611*a* (also referred to as a concave depression portion 611*a*) at the first surface 611 and another at the second surface 612 (not illustrated). The concave taper portion 611*a* is shaped, dimensioned and otherwise structured to receive and at least partially surround a thigh of a user (e.g., thigh of a first leg when the pillow apparatus is placed between the two legs of the user) and/or a crus portion/calve portion of the user's leg, based on the positioning of the pillow apparatus 600. As illustrated by FIGS. 6A and 6B, the width W may vary such that a maximum with occurs at a location between the ends 614 and 616. As illustrated, the width W, may taper/progressively decrease from the maximum towards a curved vertex/parabolic vertex at second end 616, and also taper/progressively decrease towards first end 614 (albeit to a lesser extent in comparison with second end 616 such that a width at first end 614 is greater than that at second end 616). In some embodiments, the concave portion is symmetric about the plane Y-Y. In some embodiments, the width W from its maximum may progressively decrease towards the second end 616, forming a curved (e.g., parabolic or semi-circular, etc.) cross section therebetween (best illustrated by FIG. 6B). The pillow body 610 of the pillow apparatus 600 comprises a first lateral depression 610*a* (similar to lateral depression 214*a* described previously) at the first end 614.

In some embodiments, the pillow body 610 is symmetric about a plane Y-Y, wherein the plane Y-Y is centrally positioned vertical plane between the lateral sides 613 and 615. That said, in other embodiments, it is contemplated that pillow body 610 may not be symmetric about the plane Y-Y.

As described previously, the first surface 611 may be dimensioned by a width function W and a length function L. In some embodiments, the width function W and the length function L are typically vary to form a curved shape (e.g., paraboloid shape) with lower volume of material proximate the second end 616 (as best illustrated in FIG. 6A), or alternatively, the width W and/or the length L may be constant. In some embodiments, thickness function T (not illustrated) of the pillow body 610 typically varies as a function of the length L and/or the width W, to form the concave depression portion 611*a*.

Figures 7A, 7B:
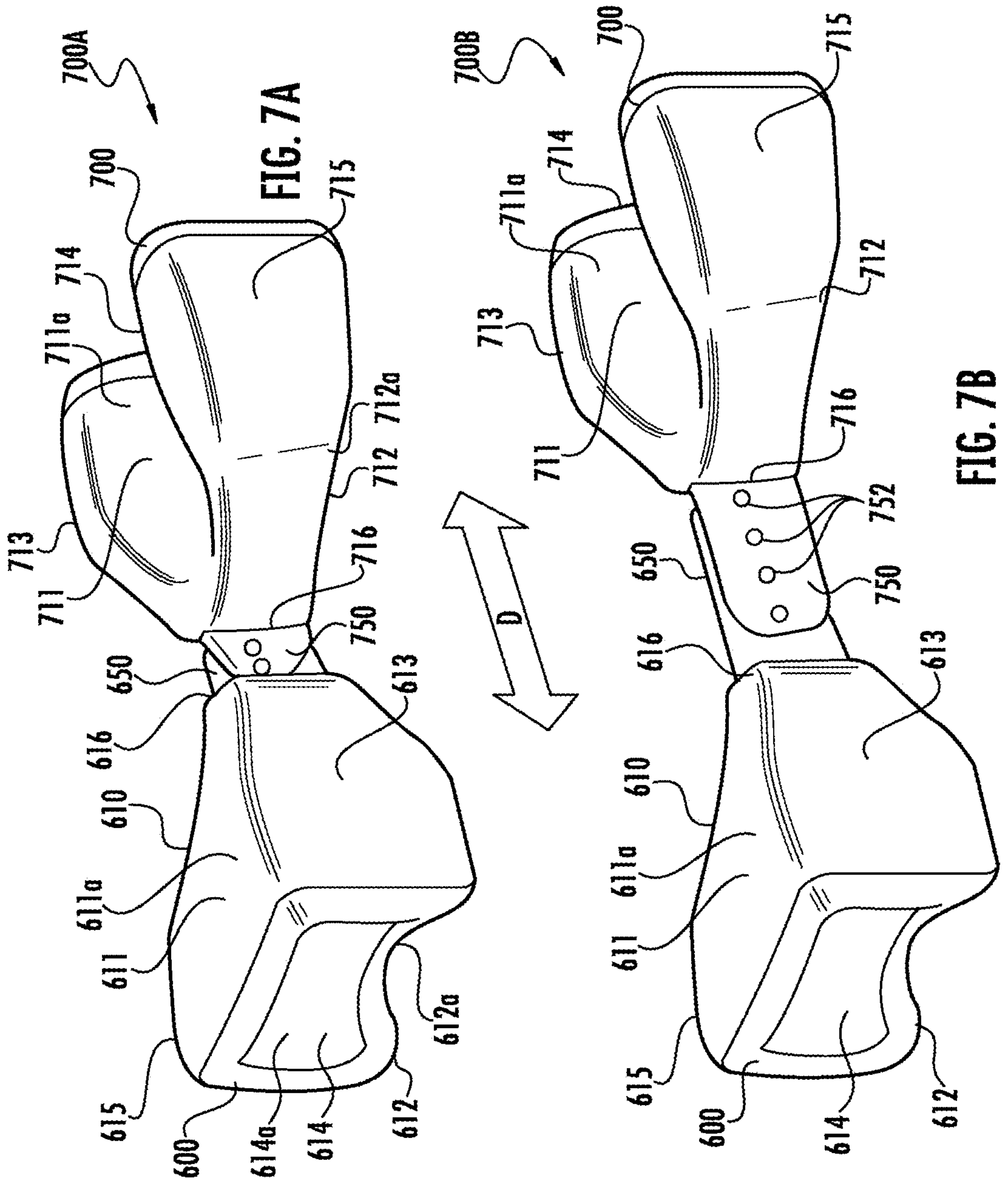
FIGS. 7A-7B illustrate perspective views of a pillow apparatus assembly, in accordance with some embodiments of the invention.

The pillow apparatus 600 comprises a coupling member 650. The coupling member 650 is provided at the second end 616, e.g., at the plane Y-Y. That said, in other embodiments, the coupling member 650 may be provided at any suitable location of the pillow apparatus 600. The coupling member 650 is structured to detachably couple the pillow apparatus 600 to another adjacent pillow apparatus (as illustrated by FIGS. 7A-7B). Alternatively, the coupling member 650 may permanently couple the pillow apparatus 600 to another adjacent pillow apparatus.

The coupling member 650 may comprise a suitable coupling mechanism such as snap mechanisms (as illustrated by FIGS. 7A-7B), clips, pins, hook-and-loop fasteners (e.g., Velcro), adhesives, tension/interference fits, belts, straps, chords, buttons, zippers, ties, an overall cover to hold the pillows, elastics, press fits, hooks, and/or another suitable mechanism (e.g., chosen based on comfort reasons). In this regard, the coupling member 650 may be made from a suitable material or a combination of materials such as plastics, textiles, fibers, metals, composites, foam, wood, paper/boards, and/or the like.

Moreover, the coupling member 650 may comprise one or more connection elements 652, through which the coupling is performed. In some embodiments, the one or more connection elements 652 form a coupling pair with the connection elements of the other pillow being coupled (e.g., pillow apparatus 700 of FIGS. 7A-7B). Here, the connection elements in the coupling pair may be complementary to facilitate coupling. For instance, the connection element(s) 652 may be in the form of a recess/aperture, which is sized/dimensioned and/or otherwise structured to receive a projection from the corresponding connection elements of the other pillow being coupled (e.g., to facilitate a snap-fit, as illustrated by FIGS. 7A-7B). As another example, the connection element(s) 652 may be in the form of a projection, which is sized/dimensioned and/or otherwise structured to be received at an aperture of the corresponding connection elements of the other pillow being coupled. As another example, the connection element(s) 652 may be in the form of hooks, which is sized/dimensioned and/or otherwise structured to be received at loops of the corresponding connection elements of the other pillow being coupled.

In some embodiments, the cover 640 comprises the coupling member 650, while in other embodiments, the coupling member 650 is provided on the pillow body 610.

FIGS. 7A-7B illustrate perspective views of a pillow apparatus assembly, in accordance with some embodiments of the invention. Specifically, FIG. 7A illustrates a perspective view 700A of the pillow apparatus 600 (described above with respect to FIGS. 6A-6B) being coupled to another pillow apparatus 700, in accordance with one aspect. FIG. 7B illustrates a perspective view 700B of the pillow apparatus 600 being coupled to pillow apparatus 700, in accordance with another aspect.

The pillow apparatus 700 is substantially similar to the pillow apparatus 600. The pillow apparatus 700 comprises a first surface 711 and an opposite second surface 712, a first lateral side 713, a first end 714, a second lateral side 715 and a second end 716. The pillow body 710 (and specifically the concave taper portion/concave depression 711*a*) is structured to support at least a portion of a crus leg part of the user when the user places the pillow apparatus 700 between the user's legs at a position between the knee and foot (e.g., between the user's calves), for example, during a side sleeping position, with the second end 716 facing the user's knees. In some embodiments, the concave depression 711*a* may be sized shaped and dimensioned for supporting at least a portion of a crus leg part of the user. In this regard, the concave depression 711*a* may be different from the concave depression 611*a* of the pillow apparatus 600 (which may be shaped, dimensioned and otherwise structured to receive and at least partially surround a thigh of a user). This allows for the user to customize, or mix and match the pillows in the assembly to suit the user's support and comfort requirements. That said, the concave depressions (611*a*, 711*a*) may be identical. Each of the first pillow body 610 and second pillow body 710 comprises a second concave depression (612*a*, 712*a*) positioned on the second surface (612, 712) of the pillow body (610, 710).

The pillow apparatus 700 also comprises a coupling member 750. The coupling member 750 is provided at the second end 716, e.g., at the side facing the user's knees when in use (while the first end 714 faces the user's feet). That said, in other embodiments, the coupling member 750 may be provided at any suitable location of the pillow apparatus 700. The coupling member 750 is structured to releasably connect or detachably couple the pillow apparatus 700 to the pillow apparatus 600.

Moreover, the coupling member 750 may comprise one or more connection elements 752, through which the coupling is performed. In some embodiments, the one or more connection elements 752 form a coupling pair with the connection elements 652 of the coupling member 650 of the pillow apparatus 600. Here, the connection elements 752 are complementary to the connection elements 652 to facilitate coupling. For instance, the connection element(s) 652 of the pillow apparatus 600 may be in the form of a recess/aperture, which is sized/dimensioned and/or otherwise structured to receive a projection from the corresponding connection elements 752 of the pillow apparatus 700, as illustrated by FIGS. 7A-7B.

The assembly/coupling process will now be described. Typically, the pillow apparatus 600 is positioned adjacent to the pillow apparatus 700 such that the coupling member 650 and the coupling member 750 are proximate. Next, the coupling member 650 and the coupling member 750 are detachably coupled/releasable connected (thereby coupling the pillow apparatus 600 to the pillow apparatus 700) via the coupling pair formed by the connection elements (652, 752), as illustrated by FIGS. 7A-7B. Moreover, in some embodiments, a distance between the pillow apparatus 600 and the pillow apparatus 700 may be varied using the coupling pair, along the direction D as illustrated, thereby customizing the arrangement for optimal support and maximum comfort. The distance between the pillows is greater at the assembly arrangement 700B than that of the assembly arrangement 700A, as illustrated.

For use, the user may place the assembly (700A or 700B) in between the user's legs such that, the pillow apparatus 600 is positioned between the user's thighs (e.g., proximate the user's knees) such that the second end 616 receives, is adjacent to, or is facing the user's knees. Moreover, the user may place the assembly (700A or 700B) in between the user's legs such that the pillow apparatus 700 is positioned between the user's crus leg portions (e.g., between the sides of the user's calves or between the portions of the user legs between the knees and the feet). Moreover, the coupling members (650, 750) are structured to be flexible such that the pillow apparatus 600 and the pillow apparatus 700 may be positioned at any relative angle (e.g., acute angles, obtuse angles, angles in the range of 0° to 90°, 0° to 180°, 0° to 360°, 0° to 135°, 10° to 135°, etc.), e.g., when the user bends the crus portion with respect to the thighs at the knees, without decoupling the assembly.

Figure 8:
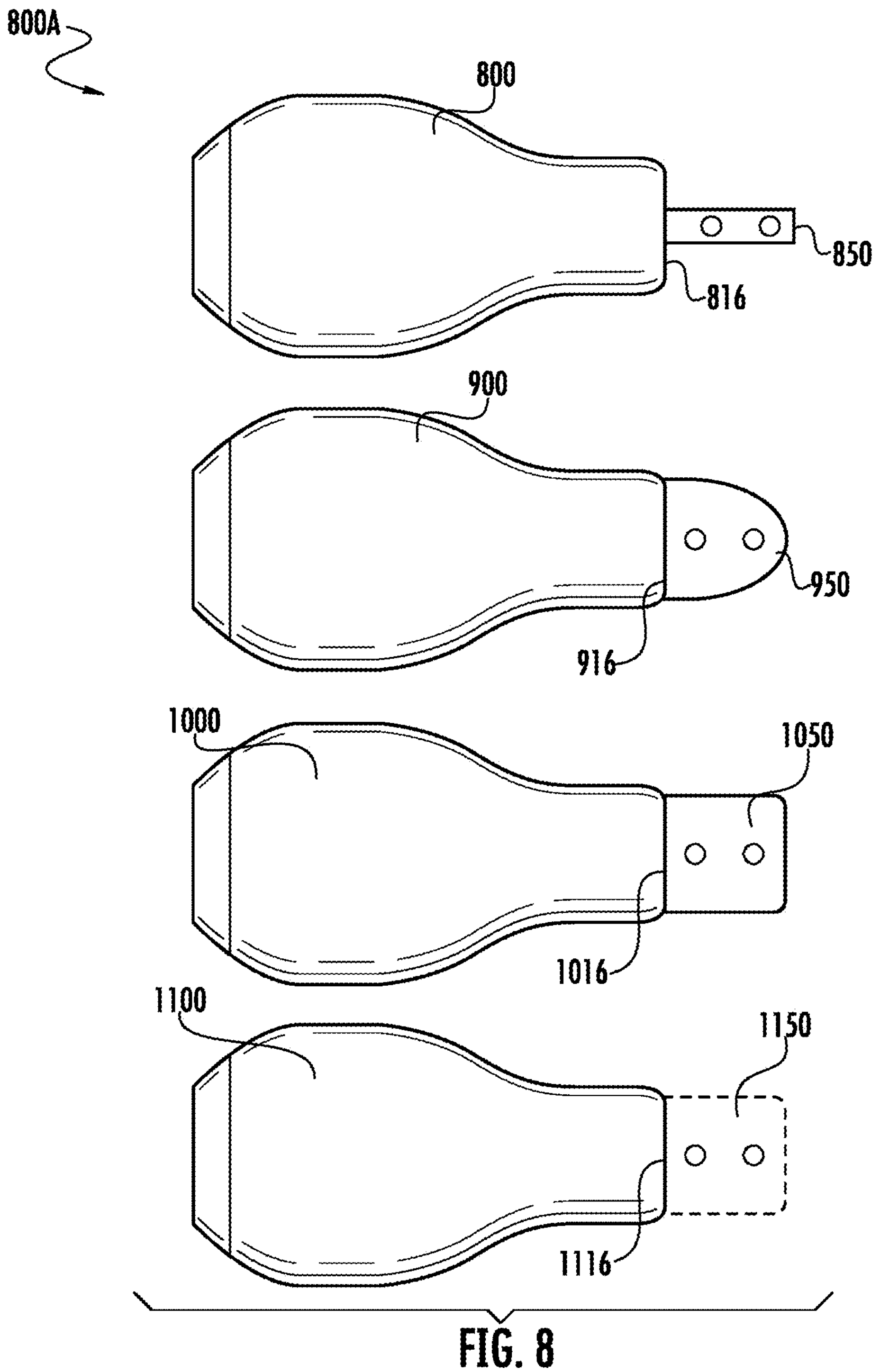
FIG. 8 illustrates a side views 800A of pillow apparatuses, in accordance with various embodiments of the invention.

FIG. 8 illustrates a side views 800A of pillow apparatuses, in accordance with various embodiments of the invention. Specifically, FIG. 8 illustrates four configurations of the pillow apparatuses (800-1100) in accordance with various embodiments of the invention. Each of the pillow apparatuses (800, 900, 1000 and 1100) may comprise at least one coupling member (850, 950, 1050 and 1150) at the second end (816, 916, 1016 and 1116), respectively, as illustrated, or at any other suitable location. As illustrated, the coupling member 850 of the pillow apparatus 800 comprises a narrow elongate rectangular shape/cross-section. The coupling member 950 of the pillow apparatus 900 comprises a parabolic or curved shape/cross-section. The coupling member 1050 of the pillow apparatus 1000 comprises a rectangular shape/cross-section. The coupling member 1150 of the pillow apparatus 1100 comprises a rectangular shape with curved ends.

Figure 9:
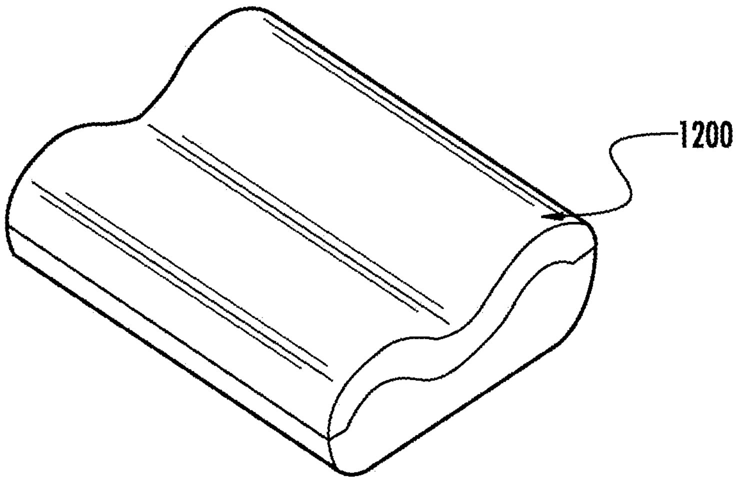
FIG. 9 illustrates a head pillow that may be sold together with the pillow apparatuses of the present invention as a combined product or kit.

FIG. 9 illustrates a head pillow 1200. The head pillow 1200 shown in FIG. 9 may be sold together with the pillow apparatuses disclosed herein as a set, combined product or kit in order to enable a user to fully align the spine of the user while resting or sleeping.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. In addition, where possible, any terms expressed in the singular form herein are meant to also include the plural form and/or vice versa. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein.

What is claimed:

1. A pillow apparatus, comprising:

a pillow body having a first end, a second end, a first lateral side, a second lateral side, a first surface extending between the first end and second end and the first lateral side and the second lateral side, a second surface extending between the first end and second end and the first lateral side and the second lateral side, a first concave depression positioned on the first surface of the pillow body, a second concave depression positioned on the second surface of the pillow body, and wherein the pillow body defines between the first and second concave depressions a first minimum thickness at the first end of the pillow body and defines between the first and second concave depressions a second minimum thickness at the second end of the pillow body, wherein the first minimum thickness is less than the second minimum thickness, and wherein the height of the first lateral side and the second lateral side tapers decreasingly in a first direction from the first end to the second end, wherein the thickness between the first and second concave depressions tapers decreasingly in a second direction, opposite to the first direction, from the second end to the first end.

2. The pillow apparatus of claim 1, wherein the first concave depression defines a first width at the first end and a second width at the second end and wherein the first width is greater than the second width.

3. The pillow apparatus of claim 2, wherein the width of the first concave depression tapers continuously from the first end to the second end or tapers discontinuously from the first end to the second end.

4. The pillow apparatus of claim 1, wherein the second concave depression defines a first width at the first end and a second width at the second end and wherein the first width is greater than the second width.

5. The pillow apparatus of claim 4, wherein the width of the second concave depression tapers gradually from the first end to the second end or tapers discontinuously from the first end to the second end.

6. The pillow apparatus of claim 1, wherein the first end of the pillow body defines a concaved surface.

7. The pillow apparatus of claim 1, wherein the first and second lateral sides define a first height at the first end of the pillow body and a second height at the second end of the pillow body and wherein the first height is greater than the second height.

8. The pillow apparatus of claim 1, further comprising:

a first cover enclosing the pillow body, the first cover comprising a first coupling member extending therefrom, wherein the first coupling member is structured to be releasably connected to a second coupling member of a second cover of a second pillow body for assembling the pillow body with the second pillow body.

9. A pillow apparatus, comprising:

a pillow body having a first end, a second end, a first lateral side, a second lateral side, a first surface extending between the first end and second end and the first lateral side and the second lateral side, a second surface extending between the first end and second end and the first lateral side and the second lateral side, and wherein the pillow body defines a first minimum thickness at the first end between the first surface and the second surface of the pillow body and a second minimum thickness at the second end between the first surface and the second surface of the pillow body, wherein the first minimum thickness is less than the second minimum thickness, and wherein the height of the first lateral side and the second lateral side tapers decreasingly in a first direction from the first end to the second end, wherein the thickness between the first and second surfaces tapers decreasingly in a second direction, opposite to the first direction, from the second end to the first end.

10. The pillow apparatus of claim 9, wherein the first and second lateral sides define a first height at the first end of the pillow body and a second height at the second end of the pillow body and wherein the first height is greater than the second height.

11. The pillow apparatus of claim 9, wherein the pillow body comprises a first concave depression positioned on the first surface of the pillow body extending from the first end to the second end, the first concave depression defining a first width at the first end and a second width at the second end and wherein the first width is greater than the second width, and wherein the width of the first concave depression tapers continuously from the first end to the second end or tapers discontinuously from the first end to the second end.

12. The pillow apparatus of claim 11, wherein the pillow body comprises a second concave depression positioned on the second surface of the pillow body and extending from the first end to the second end, the second concave depression defining a first width at the first end and a second width at the second end and wherein the first width is greater than the second width.

13. The pillow apparatus of claim 12, wherein the width of the second concave depression tapers gradually from the first end to the second end or tapers discontinuously from the first end to the second end, wherein the pillow body defines the first minimum thickness between the first and second concave depressions at the first end of the pillow body and defines the second minimum thickness between the first and second concave depressions at the second end of the pillow body, and wherein the first minimum thickness is less than the second minimum thickness.

14. The pillow apparatus of claim 9, wherein the first end of the pillow body defines a concaved surface.

15. A pillow apparatus, comprising:

a pillow body having a first end, a second end, a first lateral side, a second lateral side, a first surface extending between the first end and second end and the first lateral side and the second lateral side, a second surface extending between the first end and second end and the first lateral side and the second lateral side, a first concave depression positioned on the first surface of the pillow body, a second concave depression positioned on the second surface of the pillow body, and wherein the pillow body defines between the first and second concave depressions a first minimum thickness at the first end of the pillow body and defines between the first and second concave depressions a second minimum thickness at the second end of the pillow body, and wherein the first minimum thickness is less than the second minimum thickness and wherein the first end of the pillow body defines a concaved surface, and wherein the height of the first lateral side and the second lateral side tapers decreasingly in a first direction from the first end to the second end, wherein the thickness between the first and second concave depressions tapers decreasingly in a second direction, opposite to the first direction, from the second end to the first end.

16. The pillow apparatus of claim 15, wherein the first concave depression defines a first width at the first end and a second width at the second end and wherein the first width is greater than the second width, and wherein the width of the first concave depression tapers continuously from the first end to the second end or tapers discontinuously from the first end to the second end.

17. The pillow apparatus of claim 16, wherein the second concave depression defines a first width at the first end and a second width at the second end and wherein the first width is greater than the second width, wherein the width of the second concave depression tapers gradually from the first end to the second end or tapers discontinuously from the first end to the second end.

18. The pillow apparatus of claim 17, wherein the first and second lateral sides define a first height at the first end of the pillow body and a second height at the second end of the pillow body and wherein the first height is greater than the second height.

* * * * *